United States Patent
Kare

(10) Patent No.: US 9,726,006 B2
(45) Date of Patent: Aug. 8, 2017

(54) KINETIC PENETRATOR BEACONS FOR MULTISTATIC GEOPHYSICAL SENSING

(71) Applicant: Elwha LLC, Bellevue, WA (US)

(72) Inventor: Jordin T. Kare, Seattle, WA (US)

(73) Assignee: Elwha LLC, Bellevue, WA (US)

( * ) Notice: Subject to any disclaimer, the term of this patent is extended or adjusted under 35 U.S.C. 154(b) by 944 days.

(21) Appl. No.: 13/973,668

(22) Filed: Aug. 22, 2013

(65) Prior Publication Data

US 2015/0053480 A1  Feb. 26, 2015

(51) Int. Cl.
*E21B 47/12* (2012.01)
*G01V 1/16* (2006.01)

(52) U.S. Cl.
CPC ............. *E21B 47/12* (2013.01); *G01V 1/16* (2013.01); *G01V 1/166* (2013.01); *G01V 1/168* (2013.01); *G01V 2210/1425* (2013.01)

(58) Field of Classification Search
CPC ..... E21B 1/00; E21B 1/02; E21B 1/04; E21B 4/08; E21B 4/18; E21B 7/027; E21B 7/205; E21B 7/26; E21B 25/005; E21B 25/10; E21B 25/12; E21B 25/14; E21B 49/04; E21B 49/06; E21B 47/12; E21B 47/124
See application file for complete search history.

(56) References Cited

U.S. PATENT DOCUMENTS

| | | | |
|---|---|---|---|
| 2,544,728 A | 3/1951 | Safford | |
| 3,517,756 A | 6/1970 | Goss | |
| 3,667,553 A | 6/1972 | Gill | |
| 3,848,682 A | 11/1974 | Payne | |
| 4,702,168 A | 10/1987 | Colle et al. | |
| 4,750,570 A | 6/1988 | Barrett | |
| 4,827,823 A | 5/1989 | Barrett | |
| 2003/0136204 A1 | 7/2003 | Bergquist | |
| 2008/0179091 A1 | 7/2008 | Foley | |
| 2010/0163305 A1 | 7/2010 | Crawford et al. | |
| 2010/0268470 A1* | 10/2010 | Kamal | G01V 11/00 702/13 |
| 2010/0324868 A1 | 12/2010 | Russell et al. | |
| 2011/0198125 A1* | 8/2011 | Krahn | E21B 11/02 175/44 |
| 2011/0250582 A1* | 10/2011 | Gates | C09K 8/582 435/3 |
| 2011/0286304 A1* | 11/2011 | Thigpen | G01N 3/44 367/25 |

(Continued)

OTHER PUBLICATIONS

H.D. Murphy et al., "Development of Coring, Consolidating, Subterrene Penetrators", Los Alamos Scientific Laboratory, Mar. 1976, 19 pages.

(Continued)

*Primary Examiner* — David Andrews
*Assistant Examiner* — Tara Schimpf
(74) *Attorney, Agent, or Firm* — Foley & Lardner LLP

(57) ABSTRACT

A kinetic penetrator for multistatic geophysical sensing includes a tubular body having a first end and a second end, a nose coupled to the first end of the tubular body, and a sensing element coupled to at least one of the tubular body and the nose. The nose is configured to penetrate a ground surface and subsurface materials of a subterranean ground volume. The sensing element is configured to interface with an external geophysical sensing system.

21 Claims, 13 Drawing Sheets

(56) References Cited

U.S. PATENT DOCUMENTS

2012/0318501 A1* 12/2012 Van Der Sluis ...... E21B 47/044
                                                    166/250.11
2015/0027706 A1*  1/2015 Symms ................ E21B 34/066
                                                    166/289

OTHER PUBLICATIONS

Lorenz et al., "Demonstration of Comet Sample Collection by Penetrator", Proceedings of the 5th IAA International conference on Low-Cost Planetary Missions, Sep. 24-26, 2003, pp. 387-394.

* cited by examiner

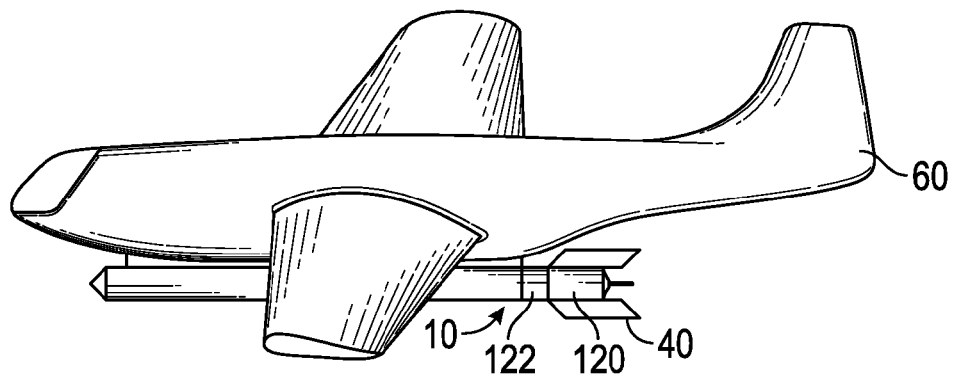
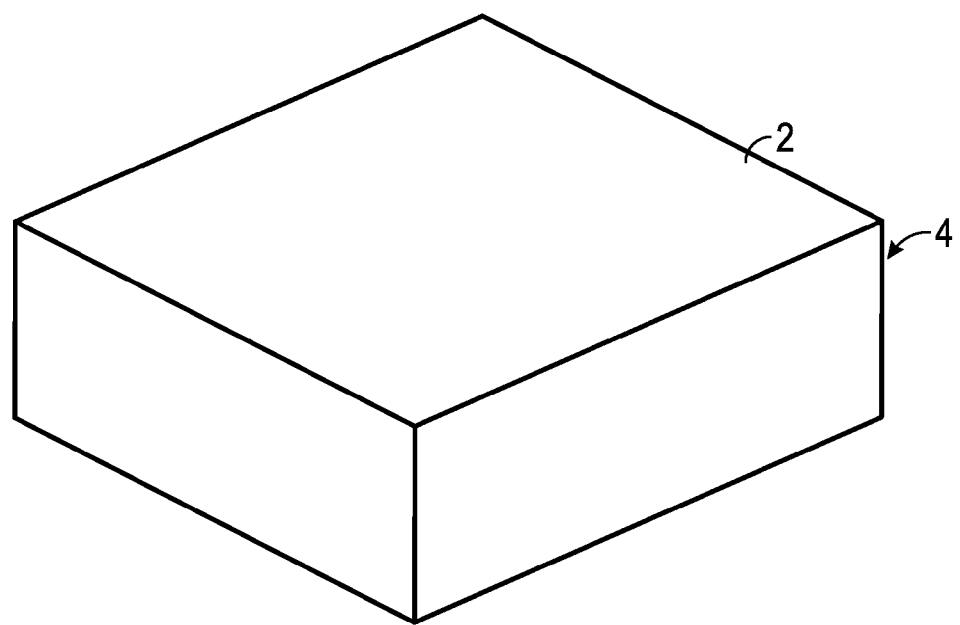
FIG. 3

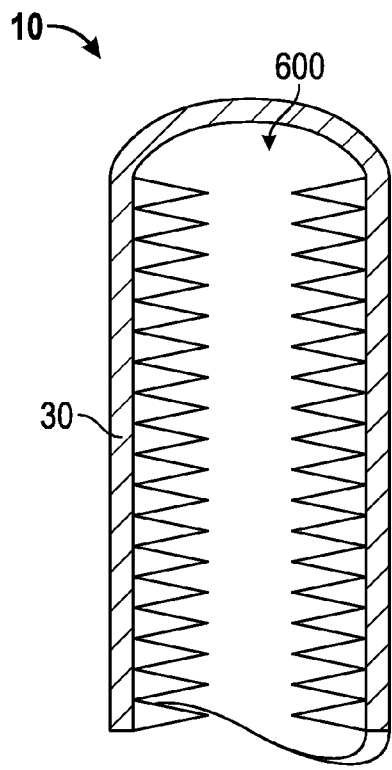
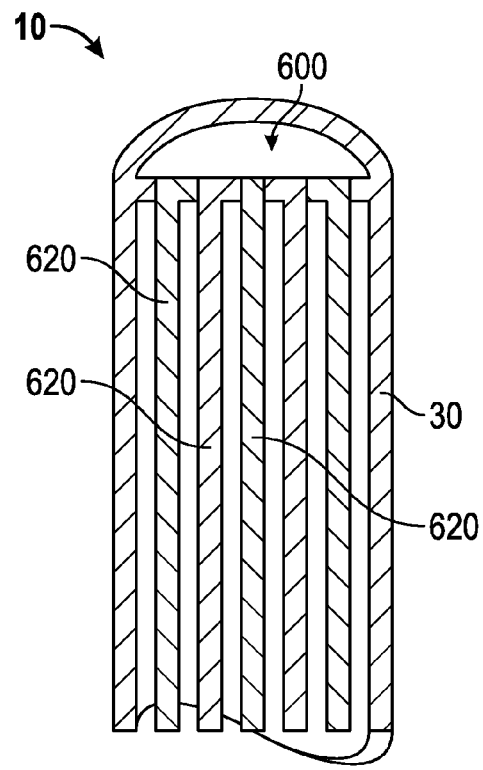
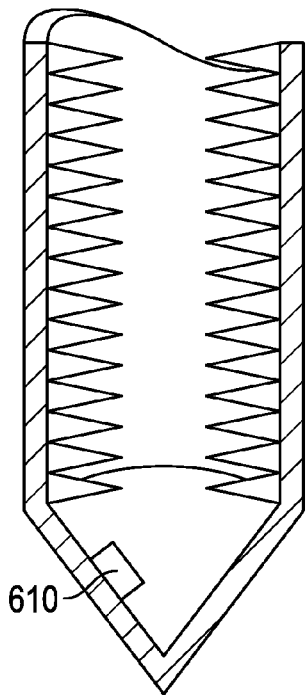
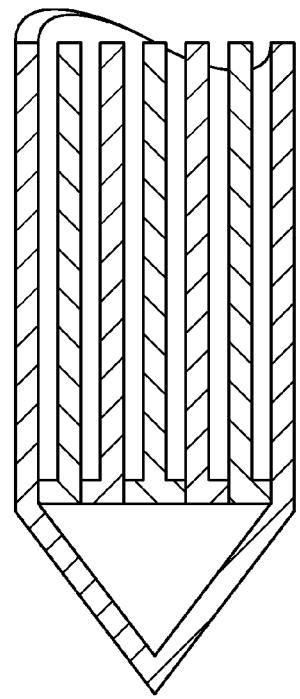
FIG. 16  FIG. 17

KINETIC PENETRATOR BEACONS FOR MULTISTATIC GEOPHYSICAL SENSING

CROSS REFERENCE TO RELATED APPLICATIONS

This application is related to U.S. application Ser. No. 13/973,547, titled "Kinetic Penetrator with a Retrieval Tether," filed Aug. 22, 2013, which is incorporated herein by reference in its entirety.

BACKGROUND

Mining is the process of removing a desired in-ground material or mineral. Such materials may include precious metals, oil, gas, and other mined substances. Mining operations often remove and refine aggregate ore from remote locations. This removal and refinement process requires moving heavy machinery and ore processing equipment to the remote location. Moving heavy equipment is costly, labor intensive, time consuming, and can adversely affect the environment. In order to promote efficiency while protecting the environment, mining operations first explore an area to determine the potential for the presence of aggregate, oil, gas, or other target substances.

Traditional methods for exploring an area of land include trenching and sample drilling. Sample drilling involves drilling an array of holes and determining the amount of aggregate ore within each sample. From this array of samples, prospectors can determine what may be potentially efficient locations to place the heavy machinery and ore processing equipment. However, drilling an array of holes requires moving the drilling equipment through the mining area and physically removing a ground sample. Obstructing materials such as trees, brush, or rocks often must be cleared before equipment may be placed in a desired location. This process may be harmful to the environment and requires the labor-intensive processes of clearing obstructions and positioning drilling equipment.

Other traditional methods for exploring an area of land include taking ground conductivity measurements and using surface-level ground penetrating radar. Ground conductivity measurements may be taken from an aerial vehicle by driving a coil into the ground and measuring the response to a low frequency output. However, this measurement technique may be complicated by variations within the ground water content. Ground penetrating radar involves searching for aggregate, oil, gas, or other target substances by moving a radar device over an area. However, these systems often include a limited penetration distance below a ground surface and may prove difficult to calibrate. Even with such other methods, ground samples are typically taken to verify the presence of aggregate, oil, gas, or other target substances.

SUMMARY

One embodiment relates to a kinetic penetrator for multistatic geophysical sensing that includes a tubular body having a first end and a second end, a nose coupled to the first end of the tubular body, and a sensing element coupled to at least one of the tubular body and the nose. The nose is configured to penetrate a ground surface and subsurface materials of a subterranean ground volume. The sensing element is configured to interface with an external geophysical sensing system.

Another embodiment relates to a kinetic penetrator for multistatic geophysical sensing that includes a tubular body having a first end and a second end, a nose coupled to the first end of the tubular body, a retrievable component, and a retrieval system. The nose is configured to penetrate a ground surface and subsurface materials of a subterranean ground volume. The retrievable component includes a sensing element configured to interface with an external geophysical sensing system. The retrieval system includes a tether coupled to the retrievable component. The tether is configured to facilitate recovery of the retrievable component from the subterranean ground volume.

Still another embodiment relates to a multistatic geophysical sensing system that includes a first kinetic penetrator, a second kinetic penetrator, and a processing circuit. The first kinetic penetrator includes a first tubular body having a first end and a second end, a first nose coupled to the first end of the first tubular body, and a first sensing element coupled to at least one of the first tubular body and the first nose. The first nose is configured to penetrate a ground surface and subsurface materials of a subterranean ground volume. The first sensing element is configured to convey a sensing signal having a specified characteristic. The second kinetic penetrator includes a second tubular body having a first end and a second end, a second nose coupled to the first end of the second tubular body, and a second sensing element coupled to at least one of the second tubular body and the second nose. The second nose is configured to penetrate the ground surface and subsurface materials of the subterranean ground volume. The second sensing element is configured to at least one of receive and reflect the sensing signal from the first sensing element. The processing circuit is configured to evaluate the sensing signal from the first sensing element and the sensing signal at least one of received and reflected by the second sensing element to determine a characteristic of the subterranean ground volume.

Yet another embodiment relates to a method of calibrating a multistatic geophysical sensing system that includes providing a kinetic penetrator, deploying the kinetic penetrator through a ground surface and into a subterranean ground volume, and interfacing with a sensing element to evaluate the subterranean ground volume. The kinetic penetrator includes a tubular body having a first end and a second end, a nose coupled to the first end of the tubular body, and the sensing element coupled to at least one of the tubular body and the nose.

Another embodiment relates to a method of evaluating a subterranean ground volume that includes providing a kinetic penetrator, deploying the kinetic penetrator through a ground surface and into the subterranean ground volume, and interfacing with a sensing element using an external geophysical sensing system to determine a characteristic of the subterranean ground volume. The kinetic penetrator includes a tubular body having a first end and a second end, a nose coupled to the first end of the tubular body, and the sensing element coupled to at least one of the tubular body and the nose.

Another embodiment relates to a method of evaluating a subterranean ground volume that includes deploying a first kinetic penetrator and deploying a second kinetic penetrator. The first kinetic penetrator includes a first tubular body having a first end and a second end, a first nose coupled to the first end of the first tubular body, and a first sensing element coupled to at least one of the first tubular body and the first nose. The second kinetic penetrator includes a second tubular body having a first end and a second end, a second nose coupled to the first end of the second tubular body, and a second sensing element coupled to at least one of the second tubular body and the second nose. The method further includes conveying a sensing signal having a specified characteristic with the first sensing element, at least one of receiving and reflecting the sensing signal with the second sensing element, and determining a characteristic of the subterranean ground volume with a processing circuit by evaluating the sensing signal conveyed by the first sensing element and the sensing signal at least one of received and reflected by the second sensing element.

The invention is capable of other embodiments and of being carried out in various ways. Alternative embodiments relate to other features and combinations of features as may be generally recited in the claims.

BRIEF DESCRIPTION OF THE FIGURES

The invention will become more fully understood from the following detailed description taken in conjunction with the accompanying drawings wherein like reference numerals refer to like elements, in which:

FIG. 3 is an elevation view of a kinetic penetrator coupled to a vehicle above a ground surface;

FIGS. 15-17 are elevation views of a kinetic penetrator having a deployable protective sheath;

DETAILED DESCRIPTION

Before turning to the figures, which illustrate the embodiments in detail, it should be understood that the application is not limited to the details or methodology set forth in the description or illustrated in the figures. It should also be understood that the terminology is for the purpose of description only and should not be regarded as limiting.

Kinetic penetrators may remove subterranean samples for later observation. A tether may be coupled to the kinetic penetrator to facilitate the recovery of either samples or the kinetic penetrator itself. Such a system is intended to improve the efficiency of land prospecting and decreases the use of heavy machinery to clear away obstructions, such as trees, in order to drill or trench a particular area to confirm the presence of minerals or materials.

Further, kinetic penetrators may include a plurality of electronic devices (e.g., sensors, transmitters, receivers, etc.). Such electronic devices may relay data associated with below-ground-surface observations. Moreover, the electronic devices may be utilized to improve the performance of ground penetrating radar systems. Performance enhancements may include increasing the penetration depth and providing a reference to facilitate calibration, among other improvements. Electronic devices may be used to directly evaluate the underground material.

Figure 1:
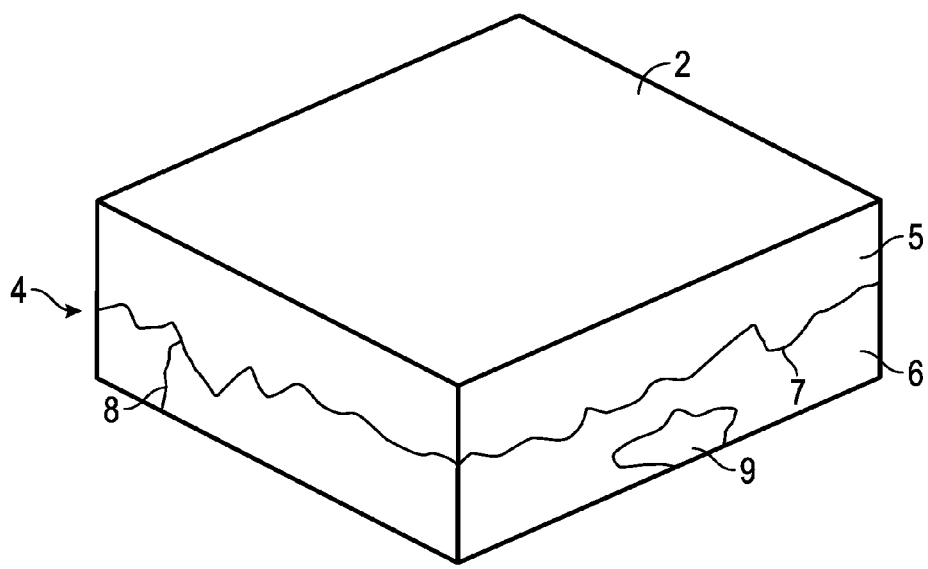
FIG. 1 is an elevation view of a ground surface and a subterranean ground volume.

Referring to FIG. 1, a portion of land that may contain aggregate, oil, gas, or other target substances is shown, according to one embodiment. Such a portion of land may contain various features that are relevant to a mining operation or mining exploration (e.g., rock interfaces, fault lines, cavities, etc.). As shown in FIG. 1, the portion of land includes a subterranean interface, shown as ground surface 2. According to one embodiment, ground surface 2 is a surface between air and a subterranean ground volume, shown as underground volume 4. According to one embodiment, ground surface 2 may be the interface between another environment (e.g., water, space, etc.) and another underground volume (e.g., an oceanic surface, a lunar surface, etc.).

As shown in FIG. 1, underground volume 4 includes an upper layer of material, shown as overburden layer 5, and a lower layer of material, shown as caprock layer 6. According to one embodiment, overburden layer 5 includes less desirable materials that are removed before mining operations. According to an alternative embodiment, overburden layer 5 may itself include aggregate, oil, gas, or other target substances. As shown in FIG. 1, overburden layer 5 contacts caprock layer 6 at an interface, shown as transition 7. Transition 7 may occur at various depths and may indicate the point where various different types of material (e.g., rock, sand, etc.) meet. Such a transition 7 may also occur at an interface between various types of rock having different conductivity or electromagnetic properties.

According to the embodiment shown in FIG. 1, caprock layer 6 also includes a vein, shown as fault line 8. Fault line 8 may include naturally occurring crevices within a layer of underground volume 4 that indicate or suggest a location where aggregate, oil, gas, or other target substances may be present. As shown in FIG. 1, caprock layer 6 also includes a cavity, shown as void 9. According to various alternative embodiments, the underground volume may include more or fewer layers, the upper layer may itself include other interfaces, veins, or cavities, or the lower layer of material may include more or fewer interfaces, veins, or cavities.

Figure 2:
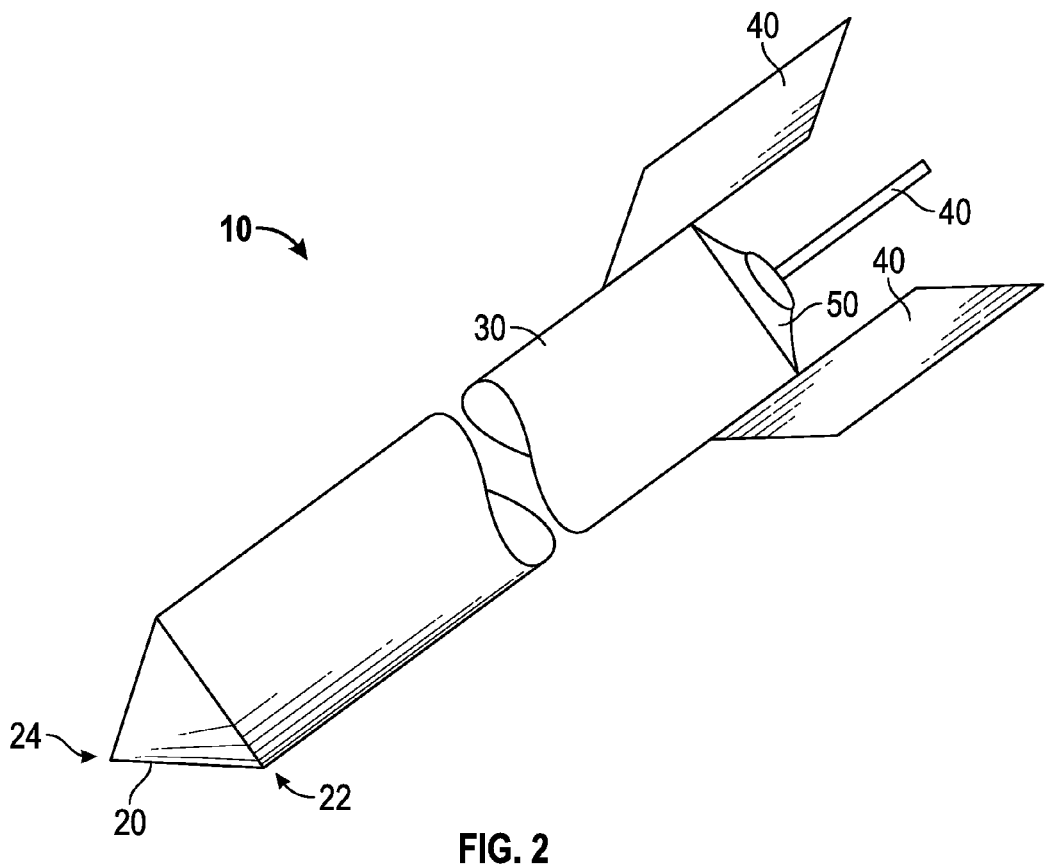
FIG. 2 is an elevation view of a kinetic penetrator.

Referring next to the embodiment shown in FIG. 2, a mining operation may need to explore a portion of an underground volume and determine the prevalence of aggregate, oil, gas, or other target substances. Such exploration may be accomplished through the use of a ground penetrator, shown as kinetic penetrator 10. As shown in FIG. 2, kinetic penetrator 10 is an elongated device capable of penetrating below a ground surface and into an underground volume to a distance substantially greater than its length and propelled primarily by its own inertia. According to one embodiment, kinetic penetrator 10 includes a structural member, shown as body 30. As shown in FIG. 2, body 30 is an elongated tubular member having a circular cross section. In one embodiment, body 30 is eight inches in diameter and thirty feet long. According to alternative embodiments, the diameter and length of body 30 may be varied to more appropriately fit a particular application having particular penetration requirements. According to still other alternative embodiments, body 30 has a different cross-sectional shape (e.g., rectangular, square, etc.).

According to one embodiment, body 30 is manufactured from a metal (e.g., steel, a steel alloy, depleted uranium, tungsten etc.). Body 30 may be an essentially solid cylinder or a hollow tube (e.g., a section of drill-pipe). Ideally, the metal used for the body has a high ultimate and yield strength and toughness value that enables the kinetic penetrator to withstand a high-velocity impact with a ground surface. However, body 30 may have various cross sectional shapes or configurations and may include a single unitary design or various subcomponents coupled (e.g., welded, fastened, adhesively secured, etc.) together.

Referring still to the embodiment shown in FIG. 2, kinetic penetrator 10 also includes a nose, shown as nose 20. As shown in FIG. 2, nose 20 is conically shaped and includes a proximal end 22 and a distal end 24. According to one embodiment, proximal end 22 of nose 20 has a circular cross section with a diameter equal to the diameter of body 30, and distal end 24 is shaped into a point having a radius that is less than half the diameter of proximal end 22. According to an alternative embodiment, proximal end 22 and distal end 24 of nose 20 may have different shapes. As shown in FIG. 2, nose 20 transitions between proximal end 22 and distal end 24 linearly. According to an alternative embodiment, nose 20 may transition between proximal end 22 and distal end 24 non-linearly (e.g., to give nose 20 a different shape). Nose 20 may be coupled to (e.g., welded, fastened, adhesively secured, press fit, etc.) or integrally formed with an end of body 30. According to various embodiments, nose 20 may be manufactured from a material having a high toughness and hardness (e.g., steel, a steel alloy, depleted uranium, tungsten, a material having a toughness and hardness greater than the ground material or rock, etc.), a ceramic, the same material as body 30, or another suitable material. Such materials may allow kinetic penetrator 10 to withstand the high-velocity impact with a ground surface and to penetrate the subsurface material.

According to the embodiment shown in FIG. 2, kinetic penetrator 10 has a guidance system that includes a plurality of aerodynamic surfaces, shown as fins 40. Fins 40 may facilitate the movement of kinetic penetrator 10 through the air towards a desired point on the ground surface by inducing rotational movement of kinetic penetrator 10 about an axis extending along the length of body 30 or may prevent body 30 from tumbling (i.e. rotating about an axis perpendicular to the length of body 30). As shown in FIG. 2, kinetic penetrator 10 includes three fins 40 coupled to an end of the body 30. According to an alternative embodiment, kinetic penetrator 10 does not include fins 40, includes more than three fins 40, or includes fewer than three fins 40. As shown in FIG. 2, fins 40 are a plurality of blades extending from an outer surface of body 30.

According to one embodiment, fins 40 are rigidly coupled (e.g., welded, fastened, adhesively secured, etc.) to body 30 thereby forming a passive guidance system. Such a passive guidance system may facilitate the movement of kinetic penetrator 10 without adjusting or moving fins 40. According to an alternative embodiment, fins 40 are movably coupled to body 30. A kinetic penetrator 10 having movable fins 40 may further include a driver configured to move at least a portion of fins 40 relative to the outer surface of body 30. Such a driver may move fins 40 in response to a signal (e.g., from a positioning system, from an operator guiding the kinetic penetrator 10, etc.) indicating that the kinetic penetrator 10 is deviating from a preferred course.

Referring still to the embodiment shown in FIG. 2, kinetic penetrator 10 also includes a system configured to increase the velocity of kinetic penetrator 10, shown as thruster 50. According to one embodiment, thruster 50 is a solid fueled rocket coupled to an end of body 30 opposite nose 20. Such a thruster 50 may increase the velocity of kinetic penetrator 10 thereby allowing kinetic penetrator 10 to travel to a greater depth below a ground surface. According to an alternative embodiment, thruster 50 may provide the primary motive force to kinetic penetrator 10 and facilitate the transmission of kinetic penetrator 10 from one location to another (e.g., move kinetic penetrator 10 along an arced trajectory). According to still another alternative embodiment, thruster 50 is movable relative to body 30 to direct (e.g., steer, manipulate, affect, etc.) the movement of kinetic penetrator 10.

According to the embodiment shown in FIG. 3, kinetic penetrator 10 is initially located above ground surface 2. As shown in FIG. 2, kinetic penetrator 10 is transported by a vehicle, shown as aerial vehicle 60 in an elevated position relative to ground surface 2. Such an aerial vehicle 60 may include an airplane, a helicopter, a balloon, or another type of vehicle capable of transporting kinetic penetrator 10 at altitude. According to one embodiment, kinetic penetrator 10 is released from aerial vehicle 60 and allowed to move (e.g., fall, travel, etc.) towards ground surface 2.

The movement of kinetic penetrator 10 may be facilitated with a passive guidance system or with an active guidance system, shown as instrument 120. According to one embodiment, instrument 120 is coupled to one of moveable fins 40 or a thruster. Such systems may influence the flight path of kinetic penetrator 10 as it travels through the atmosphere to improve accuracy (i.e. the ability of the kinetic penetrator 10 to enter the ground surface at a specified location) and to ensure that the penetrator enters the ground with a velocity parallel to its longitudinal axis thereby reducing torques on the kinetic penetrator 10 as it enters the ground and travels through the underground volume. A thruster may also be used to increase the flight speed of the kinetic penetrator thereby increasing the penetration depth of the kinetic penetrator. According to various alternative embodiments, instrument 120 may be a sonar guidance system, a laser-guidance system, a radar guidance system, an infrared guidance system, a global positioning system, an inertial guidance system, or any other system configured to direct kinetic penetrator 10. A post-impact guidance system 122 may measure the motion of the kinetic penetrator 10 as it travels through underground volume 4, and may in some embodiments direct the motion of the kinetic penetrator 10 through the underground volume. Such direction may occur by shifting the nose relative to the body or by extending a bar or other structure outward from the body on one side, among other alternatives. A transmitter (e.g., a laser transmitter) may interact with a sensor on the body to ensure that the body travels through the ground volume along a preferred path (e.g., straight down). According to one embodiment, instrument 120 also includes a tracker configured to assist in locating the penetrator after deployment. By way of example, the tracker may be a homing device or a transmitter capable of relaying the latitude and longitude coordinates of the penetrator.

Figure 4:
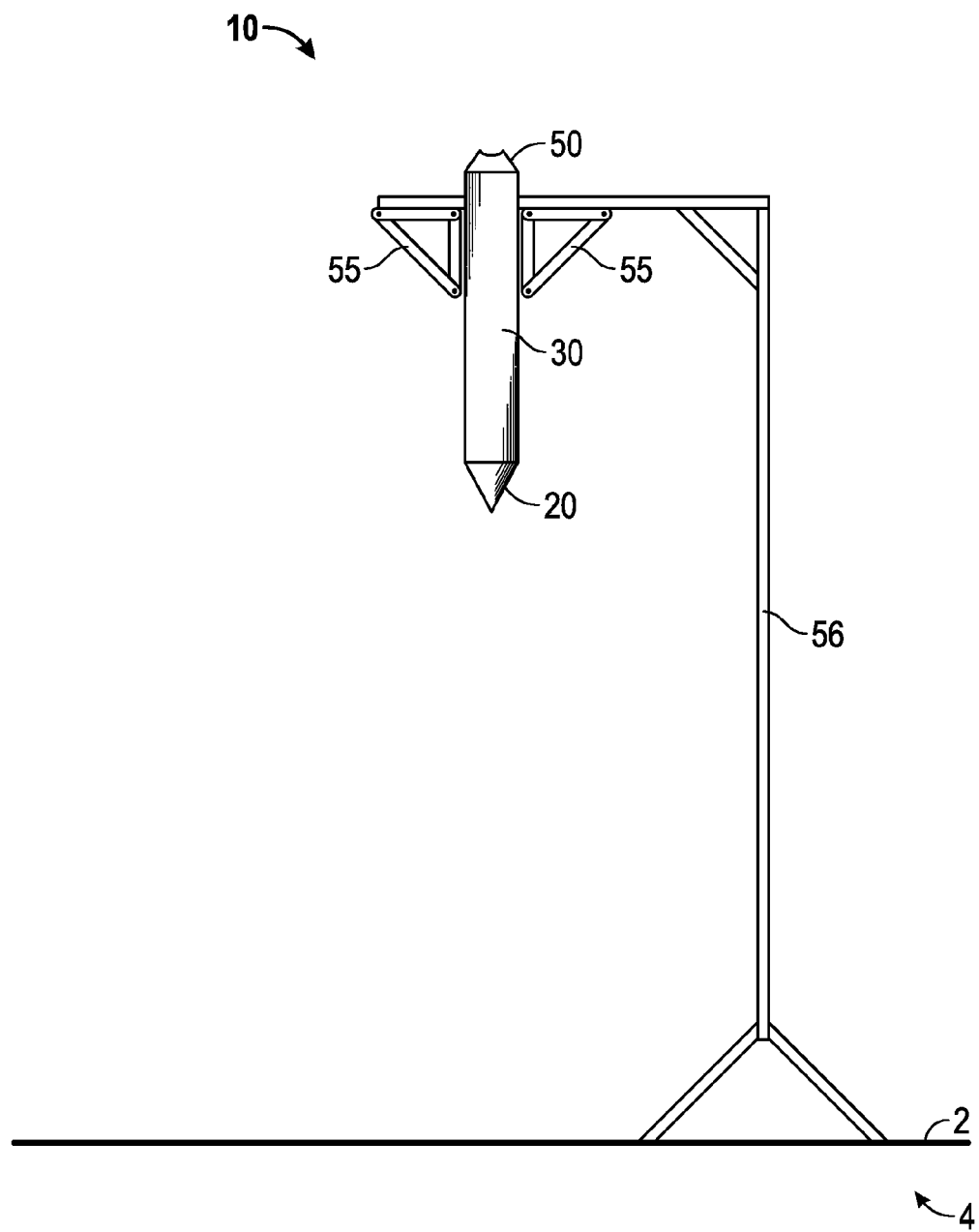
FIG. 4 is an elevation view of a kinetic penetrator supported above a ground surface.

Referring next to the alternative embodiment shown in FIG. 4, kinetic penetrator 10 is initially supported above ground surface 2. A kinetic penetrator 10 supported above ground surface 2 may be preferred where releasing kinetic penetrator 10 from a vehicle is not practical (e.g., due to adverse weather conditions, due to an increased cost, etc.). As shown in FIG. 4, kinetic penetrator 10 includes thruster 50 coupled to an end of body 30 opposite nose 20. According to one embodiment, thruster 50 accelerates kinetic penetrator 10 to a high velocity (e.g., more than three hundred meters per second, etc.) before body 30 penetrates ground surface 2. In some embodiments, thruster 50 continues to accelerate kinetic penetrator 10 after body 30 penetrates ground surface 2 (e.g., until body 30 interacts with a hard subterranean material). According to an alternative embodiment, kinetic penetrator 10 may include another system capable of moving (e.g., propelling, driving, etc.) kinetic penetrator 10 below ground surface 2.

According to the embodiment shown in FIG. 4, one or more guidance structures, shown as supports 55, are positioned alongside kinetic penetrator 10. As shown in FIG. 4, supports 55 include various structural members arranged to support kinetic penetrator 10 in an upright position. Supports 55 may interface with a support structure (e.g., a derrick, a crane, etc.), shown as structure 56. Such an upright position may be an orientation where the body 30 of kinetic penetrator 10 is perpendicular to ground surface 2. According to an alternative embodiment, the body 30 of kinetic penetrator 10 may be oriented at a different angle relative to ground surface 2 to, by way of example, avoid an undesirable (e.g., dense, non-uniform, etc.) portion of underground volume 4. As shown in FIG. 4, supports 55 include a plurality of structural members arranged in a triangular configuration. Such supports 55 include a contacting surface configured to interface with (e.g., by having a corresponding shape, etc.) body 30. According to an alternative embodiment, the guidance structure may include a guide section having an arced or tubular shape that is configured to receive and support body 30 of kinetic penetrator 10.

According to an alternative embodiment, the kinetic penetrator may be released from a land-based object, such as a vehicle, using an attached thruster. Such a configuration may resemble a traditional short-range missile system, but differs in the vehicle configuration (e.g., a very high ratio of length to diameter, very heavy construction, etc.) and in launch angle range (e.g., the kinetic penetrator may have a nearly vertical launch angle). According to still another alternative embodiment, the kinetic penetrator may be released (e.g., propelled, fired, etc.) with an initial velocity thereby reducing the need for a secondary thruster. Such a configuration may resemble a traditional mortar, tank-fired round, or a magnetically fired shell. The kinetic penetrator may be surrounded prior to release by a sabot. By way of example, the kinetic penetrator may have an outer diameter that is received by the sabot. The sabot may be discarded immediately after release, or at any point prior to the entry of the penetrator into caprock or other hard subsurface material. Vehicles capable of releasing such a kinetic penetrator may include a tank or a vessel. Any such kinetic penetrator may optionally also include a thruster to propel it through an atmosphere or to a greater penetration depth below a ground surface.

Figure 5:
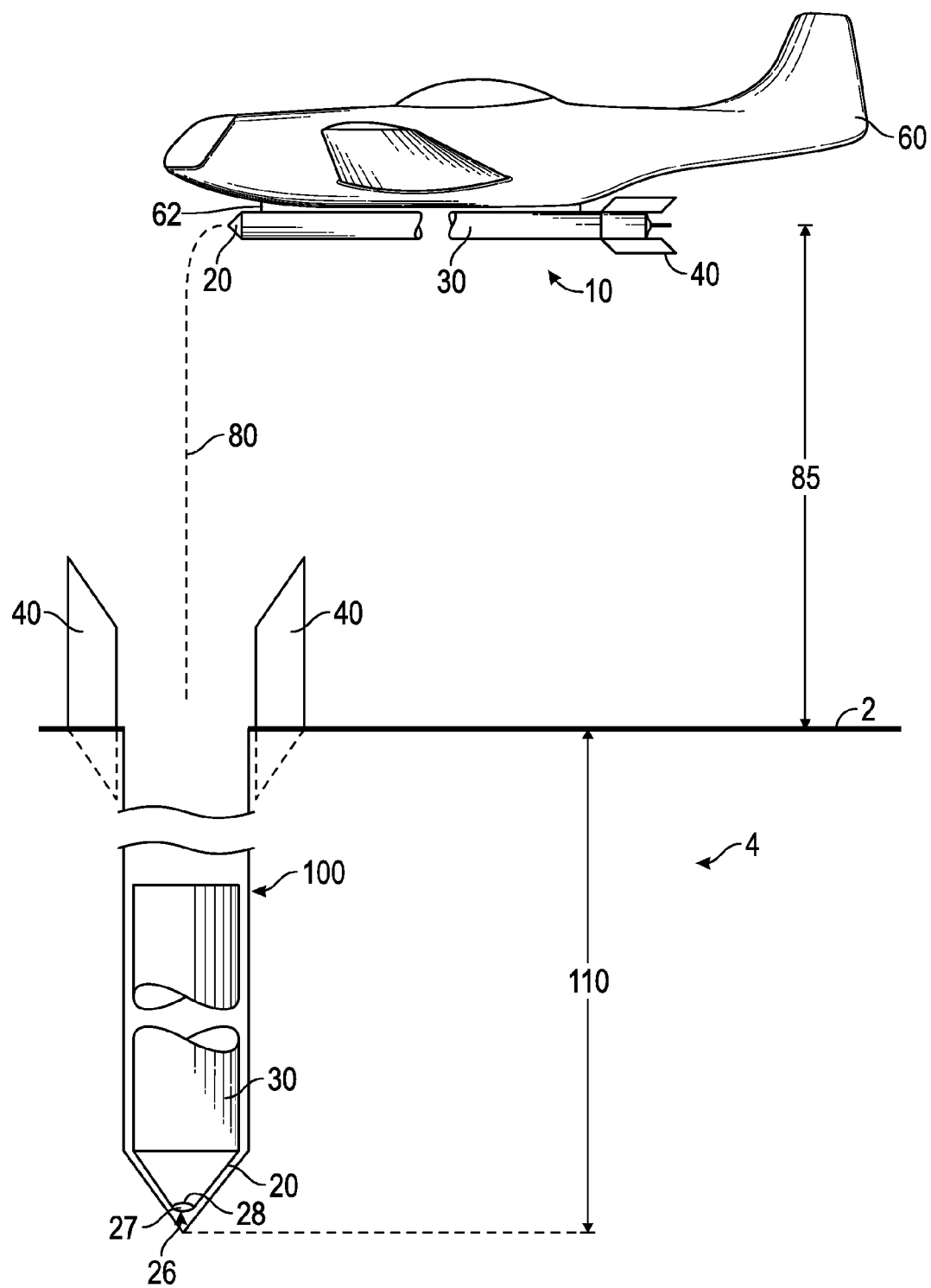
FIG. 5 is an elevation view of a kinetic penetrator that is initially positioned above a ground surface and thereafter positioned below a ground surface.

Referring next to the embodiment shown in FIG. 5, kinetic penetrator 10 is shown as initially supported by aerial vehicle 60 at an elevated height, shown as altitude 85. Altitude 85 may vary between five hundred and forty thousand feet above ground surface 2, depending on the particular application and required penetration depth of kinetic penetrator 10. According to one embodiment, altitude 85 is between ten and twenty thousand feet above ground surface 2.

As shown in FIG. 5, kinetic penetrator 10 is coupled to an underside of aerial vehicle 60 with a fastener, shown as release system 62. According to one embodiment, release system 62 includes a plurality of supports (e.g., bars, members, wires, etc.) extending downward from the underside of aerial vehicle 60 and a plurality of fasteners coupled to the body 30 of kinetic penetrator 10 with a release mechanism. Such a release mechanism may be operated remotely (e.g., through the use of an actuator, etc.) or may be operated manually by a user (e.g., with a quick release coupler operated with a wire by a user positioned within the aerial vehicle 60).

Referring still to the embodiment shown in FIG. 5, activation of the release mechanism of release system 62 allows kinetic penetrator 10 to accelerate towards ground surface 2. According to one embodiment, kinetic penetrator 10 accelerates at approximately 32.2 feet per second squared. According to an alternative embodiment, kinetic penetrator 10 may accelerate at a lower rate (e.g., due to aerodynamic drag) or may accelerate a greater rate (e.g., due to the additional force of a thruster). As shown in FIG. 5, kinetic penetrator 10 falls towards ground surface 2 along a route, shown as curved path 80.

Upon impact with ground surface 2, the nose 20 of kinetic penetrator 10 forces ground material (e.g., dirt, rocks, organic material, etc.) outward, according to one embodiment. As shown in FIG. 5, kinetic penetrator 10 passes through underground volume 4, and the nose 20 continues to force ground material outward. Such movement of kinetic penetrator 10 forms a void, shown as shaft 100. According to one embodiment, kinetic penetrator 10 continues to decelerate as it travels through underground volume 4 and ultimately comes to rest at a distance below ground surface 2, shown as penetration depth 110. According to one embodiment, penetration depth 110 has a value up to ten times the length of kinetic penetrator 10. According to one embodiment, kinetic penetrator 10 reaches a penetration depth 110 of 300 feet within less than one second. Also as shown in FIG. 5, portions of kinetic penetrator 10 outside of body 30 (e.g., fin assembly 40) may be stripped from body 30 by impact with ground surface 2 and remain at or near ground surface 2. Alternatively, portions of kinetic penetrator 10 (e.g., fin assembly 40) may be deliberately released from body 30 (e.g., by an altimeter-triggered or impact-triggered release mechanism) at a desired time either before or after kinetic penetrator 10 strikes ground surface 2.

Figure 6:
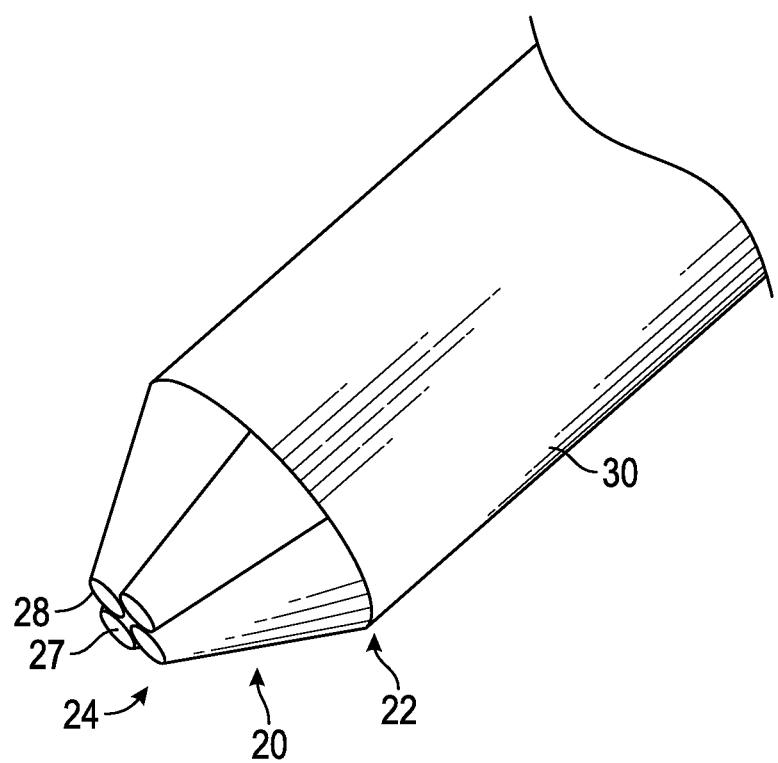
FIG. 6 is an elevation view of a kinetic penetrator nose having a plurality of extractors.

According to the embodiment shown in FIGS. 5-6, kinetic penetrator 10 includes a sampling tool, shown as extractor 26. As shown in FIGS. 5-6, extractor 26 is coupled to distal end 24 of nose 20. According to one embodiment, extractor 26 includes a void, shown as aperture 27, surrounded by an edge, shown as blade 28. Such a blade 28 may be configured to cut (i.e. slice, cleave, shave, separate, etc.), rather than force aside, ground material as kinetic penetrator 10 travels through underground volume 4. The cutting action of blade 28 may facilitate the flow of ground material through aperture 27 and into body 30. According to the embodiment shown in FIG. 5, extractor 26 includes a single aperture 27 and a single blade 28. According to the alternative embodiment shown in FIG. 6, extractor 26 includes four apertures 27 and blades 28. According to still other alternative embodiments, extractor 26 may include more ore fewer apertures 27 and blades 28. As shown in FIGS. 5-6, apertures 27 and blades 28 are circularly shaped. According to various alternative embodiments, apertures 27 and blades 28 may have a rectangular, oval, or other suitable shape.

According to the embodiment shown in FIGS. 5-6, extractor 26 cuts through ground material due to the force exerted on blade 28 as kinetic penetrator 10 impacts ground surface 2. According to an alternative embodiment, extractor 26 may include a drill system having a spinning blade (i.e. bit, auger, etc.) that allows kinetic penetrator 10 to achieve a greater penetration depth 110. Such a drill system may be configured to operate after kinetic penetrator 10 comes to rest or as kinetic penetrator 10 is passing through underground volume 4 and may be controlled by a processor. In some embodiments, kinetic penetrator 10 may itself rotate around its long axis, either for stability or to enhance the cutting action of extractor 26.

Figure 8:
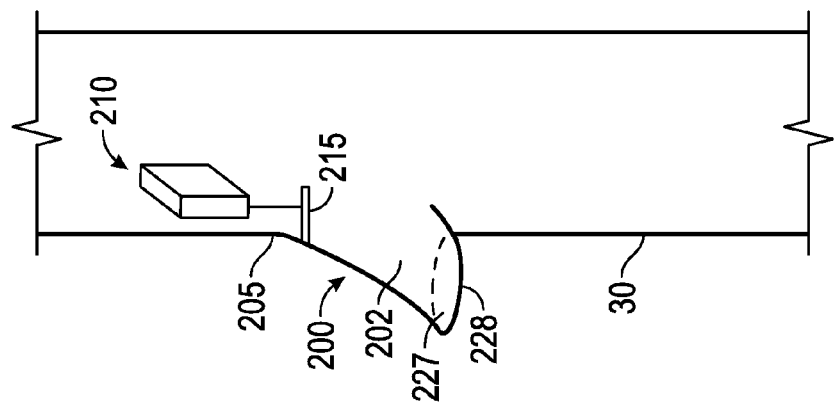
FIG. 8 is an elevation view of an extractor coupled to the side of a tubular body.
Figure 7:
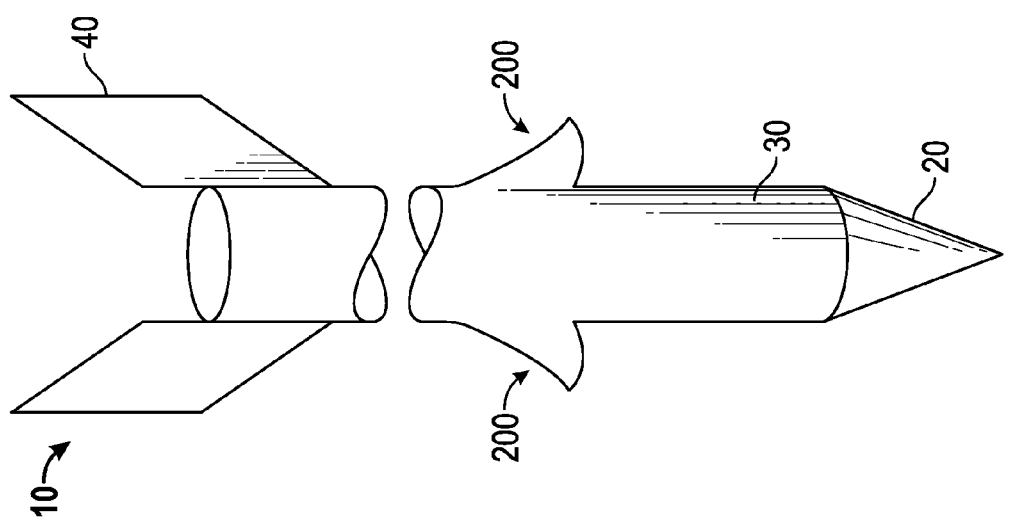
FIG. 7 is an elevation view of a kinetic penetrator having a plurality of extractors coupled to a body portion.

According to the alternative embodiment shown in FIGS. 7-8, kinetic penetrator 10 includes a plurality of sampling scoops (e.g., side scoops, etc.), shown as extractors 200, positioned along body 30. As shown in FIG. 7, kinetic penetrator 10 includes two extractors 200. According to an alternative embodiment, kinetic penetrator 10 may include more or fewer extractors 200 positioned in various locations (e.g., on a surface of nose 20, on a different portion of body 30, etc.). Such extractors 200 are preferably positioned uniformly around the periphery of kinetic penetrator 10. By way of example, uniformly positioning extractors 200 may facilitate the desired movement (e.g., straight down, at a preferred angle, etc.) of kinetic penetrator 10 through underground volume 4.

According to the embodiment shown in FIGS. 7-8, extractors 200 include a void, shown as aperture 227, surrounded by an edge, shown as blade 228. According to one embodiment, extractors 200 include a panel, shown as housing 202, rotatably coupled to body 30 with a pivot, shown as hinge 205. Such a housing 202 may rotate outward from body 30 upon impact or at a preferred distance below ground surface 2 to expose blade 228. Once exposed, blade 228 may cut (i.e. slice, cleave, shave, separate, etc.) ground material thereby allowing it to flow through aperture 227 and into body 30. According to an alternative embodiment, extractor 200 includes an aperture facing upward toward a ground surface. Such a configuration may allow for the capture and examination of in-fill ground material.

According to the embodiment shown in FIG. 8, kinetic penetrator 10 includes a processing circuit, shown as control system 210. Such a control system 210 may be configured to operate the extractors 200 between a closed position where the extractors 200 are coplanar (i.e. flush) with the body 30, and an open position, where the aperture 227 is able to receive a sample removed by the blade 228. As shown in FIG. 8, control system 210 is electronically controlled and coupled to a driver, shown as actuator 215. According to one embodiment, actuator 215 is coupled to body 30 and housing 202 and operates to open or close extractor 200.

According to various alternative embodiments, control system 210 may be operated hydraulically or pneumatically and may interact with a various known types of actuators (e.g., rotational actuators, linear actuators, etc.) that may themselves be hydraulic, pyrotechnic, pneumatic, or electric, among other known types of actuators. According to yet another alternative embodiment, control system 210 may be impact-actuated, actuated based on a timer, remote controlled, or controlled using a combination of these or other known systems. By way of example, control system 210 may include an accelerometer and open extractor 200 upon impact with a ground surface, or an operator may selectively pre-program control system 210 to open extractor 200 in order to obtain samples (e.g., at a desired depth beneath a ground surface, a desired time after impact, etc.). According to still another alternative embodiment, housing 202 extends past an outer surface of body 30 such that it rotates outward about hinge 205 after catching upon (i.e. interacting with, engaging, etc.) ground material upon impact. According to still another alternative embodiment, housing 202 may extend linearly rather than rotate outward from body 30. According to one embodiment, kinetic penetrator 10 includes extractor 26 and at least one extractor 200. According to various alternative embodiments, kinetic penetrator 10 may include only extractor 26, an extractor located on another portion of nose 20 or body 30, only extractors 200 without extractor 26, or neither extractor 26 or extractors 200.

Figure 9:
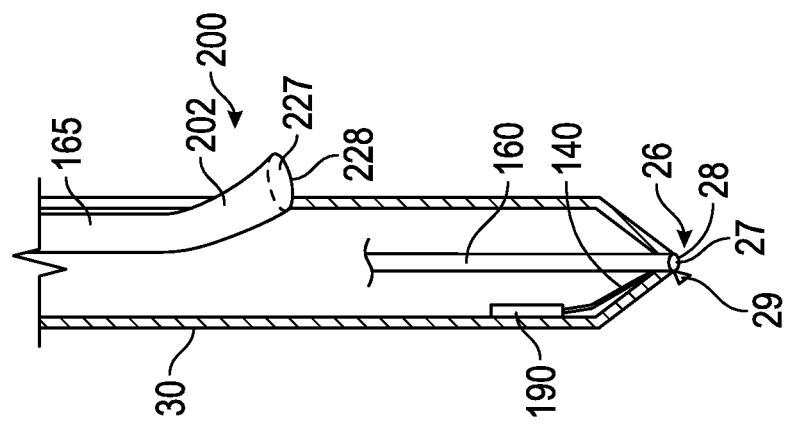
FIG. 9 is an elevation view of extractors and compartments coupled to a tubular body.

Referring next to the embodiment shown in FIG. 9, kinetic penetrator 10 includes a storage volume, shown as compartment 160. As shown in FIG. 9, compartment 160 is a tubular structure configured to store a portion of ground material that flows through aperture 27. Storage of ground material may be beneficial for the exploration of a portion of land. By way of example, knowing the geological composition of ground material at a specific depth may allow miners to determine whether to conduct further studies or may suggest the presence of aggregate, oil, gas, or another composition. According to an alternative embodiment, compartment 160 is a flexible tubular system (i.e. a sock design, a plurality of telescoping tubes, a corrugated straw design, etc.) that extends as ground material enters compartment 160. Such a compartment 160 may have a total, extended length greater than the length of body 30.

According to one embodiment, compartment 160 is removably coupled to various components of kinetic penetrator 10. As shown in FIG. 9, compartment 160 is coupled with aperture 27 of extractor 26 and positioned along a longitudinal axis of body 30. According to one embodiment, extractor 26 and compartment 160 are both oriented along a centerline of body 30. According to an alternative embodiment, compartment 160 may be offset from the centerline of body 30 and coupled to aperture 27 with, by way of example, an angled or curved tubular section.

Referring still to the embodiment shown in FIG. 9, kinetic penetrator 10 includes extractor 200 and a second storage volume, shown as second compartment 165. Second compartment 165 may be removably coupled to various components of kinetic penetrator 10. As shown in FIG. 9, second compartment 165 is tubular and coupled to a sidewall of body 30. According to an alternative embodiment, kinetic penetrator 10 may include more storage volumes (e.g., similarly coupled to additional extractors, etc.) or may include fewer storage volumes. As shown in FIG. 9, second compartment 165 is coupled to aperture 227 of extractor 200 such that ground material flows through aperture 227 and into second compartment 165.

According to the embodiment shown in FIG. 9, extractor 26 includes a cover, shown as door 29, configured to selectively seal aperture 27 thereby preventing the flow of material into compartment 160. Such a door 29 may allow an operator to selectively collect samples of ground material at one or more preferred depths below a ground surface. As shown in FIG. 9, door 29 is hinged to a portion of blade 28. According to an alternative embodiment, door 29 may rotate or slide to expose aperture 27 and allow for the flow of material into compartment 160. According to still another alternative embodiment, door 29 may remain open as kinetic penetrator 10 travels through underground volume 4 such that ground material passes through compartment 160 and out of body 30 through a secondary aperture having a secondary door. Such a secondary door may be thereafter closed to facilitate the recovery of only a portion (e.g., the deepest) ground material that entered compartment 160.

According to one embodiment, door 29 may be coupled to a processing circuit, shown as system 190. System 190 configures door 29 in either an open or a closed orientation or may otherwise manage the position of door 29. According to one embodiment, system 190 includes an electrically powered actuation mechanism. According to alternative embodiments, system 190 may include an explosively, hydraulically, or pneumatically powered actuation mechanism. As shown in FIG. 9, system 190 is configured to selectively open door 29 upon impact with a ground surface or at one or more preferred depths. According to one embodiment, system 190 is operated remotely (e.g., by a user, upon receiving a signal, etc.).

According to an alternative embodiment, system 190 includes a timer and opens door 29 a preferred length of time after kinetic penetrator 10 is released. According to still another alternative embodiment, system 190 includes both an impact-actuated system and a timer such that after the kinetic penetrator 10 impacts a ground surface, the timer starts, and system 190 opens door 29 after a preferred length of time. Such control schemes allow for system 190 to selectively open door 29 thereby allowing for the selective removal of ground material corresponding to preferred depths below a ground surface. While this discussion focused on a cover disposed proximate aperture 27, it should be understood that extractors 200 or another aperture (e.g., within the nose of 200 or located elsewhere on body 30) may similarly include a cover configured to selectively seal an aperture.

Figure 10:
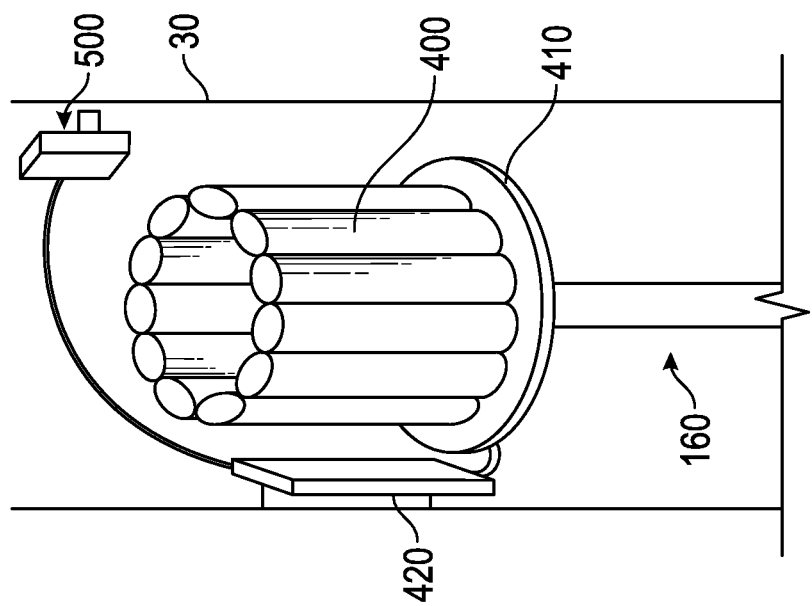
FIG. 10 is an elevation view of a rotatable compartment system for a kinetic penetrator.

According to the embodiment shown in FIG. 10, kinetic penetrator 10 includes a plurality of storage volumes, shown as compartments 400. Such compartments 400 may be removably coupled to various components of kinetic penetrator 10. As shown in FIG. 10, compartments 400 are arranged in a circular configuration on a support, shown as carriage 410. According to one embodiment, carriage 410 is rotated by a driver, shown as rotator 420 that is coupled to a base portion of carriage 410. A plurality of compartments 400 arranged on a carriage 410 may allow for the collection of samples having a combined length greater than the length of kinetic penetrator 10.

Referring still to the embodiment shown in FIG. 10, compartment 160 extends upwards to the base of carriage 410. A kinetic penetrator 10 having a plurality of compartments 400 allows material to flow through compartment 160 and into a first compartment 400. Once first compartment 400 is full, a processing circuit, shown as sample identifier 500 may send a signal to rotator 420 to cycle (i.e. rotate, move, translate, etc.) carriage 410 to position an empty compartment 400 proximate the end of compartment 160. This process allows for each compartment 400 to include material collected at a different depth and may continue until all of the compartments 400 are filled or kinetic penetrator 10 stops moving through an underground volume.

According to an alternative embodiment, a plurality of compartments may be stationary within body 30. Such a configuration may also allow for the acquisition of multiple samples corresponding to different depths or multiple samples taken at preferred depths. According to one embodiment, the operation of several extractors and covers may be controlled (e.g., timed, etc.) to open at various depths and place samples in different compartments initially. According to an alternative embodiment, a tube proximate the extractor may move (e.g., rotate, translate, etc.) to facilitate the filling of various stationary compartments. Such a system may also involve an identifier (e.g., time-varying paint system, etc.) to associate the various samples with a corresponding depth.

According to one embodiment, the various storage volumes of kinetic penetrator 10 include an identification system to differentiate between the various samples taken at different depths or between the samples taken by different extractors. Such an identification system may be coupled to one of the compartments, the extractor, or another component of kinetic penetrator 10. According to one embodiment, the identification system is a compartment system having inner surfaces of the tubes coated with a dye (e.g., paint, powdered product, etc.). According to an alternative embodiment, the various storage volumes may be numbered. According to still another alternative embodiment, the identification system may include a time-varying dye system, a time-varying paint system, or another known system for differentiating between samples of ground material.

Figure 11:
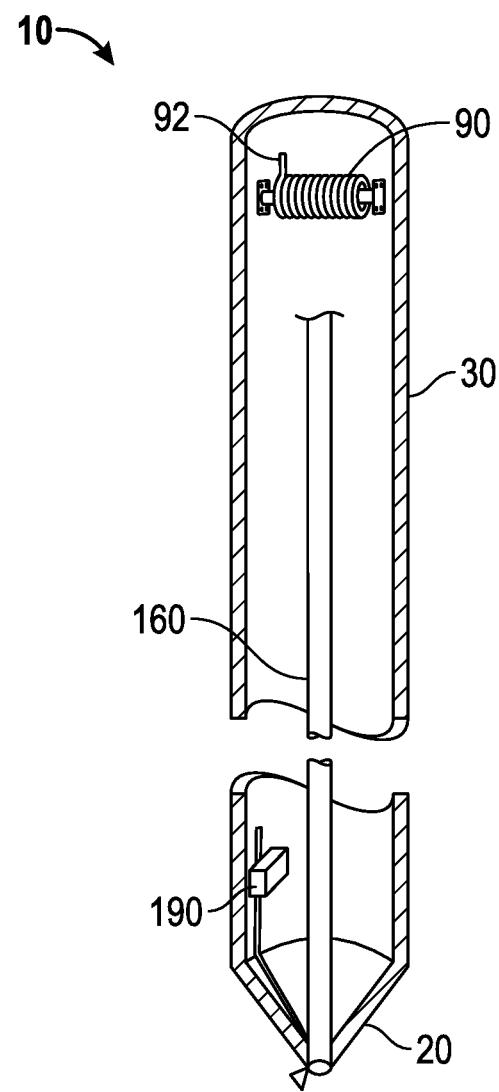
FIG. 11 is an elevation view of a kinetic penetrator having a retrieval tether.

Referring next to the embodiment shown in FIG. 11, kinetic penetrator 10 includes a transmission and retrieval system, shown as tether 90. According to one embodiment, tether 90 comprises a flexible and structural member capable of removing at least a portion of kinetic penetrator 10 from below a ground surface. Such a structural member may include a rope, cable, strap, thread, pipe, or tube, among other suitable configurations, and may be manufactured (i.e. formed, braided, woven, etc.) from various known materials (e.g., Spectra® as manufactured by Honeywell Corporation, a high strength polyethylene, Kevlar, carbon fiber, steel, another synthetic material, a nanotube structure, etc.).

According to an alternative embodiment, tether 90 includes a flexible data transmission line capable of sending and receiving signal information. By way of example, such a tether 90 may be used to retrieve information collected with kinetic penetrator 10. According to still another alternative embodiment, tether 90 may have structural characteristics and data transmission capabilities. According to yet another alternative embodiment, kinetic penetrator 10 may include a plurality of tethers 90 having any combination of structural and data transmission capabilities.

As shown in FIG. 11, tether 90 includes a first end 92 configured to be extended (e.g., released, paid out, propelled, etc.) and a second end coupled to another portion of kinetic penetrator 10. According to the embodiment shown in FIG. 11, the second end of tether 90 is coupled to body 30. Coupling tether 90 to body 30 allows an operator to remove (i.e. pull out, retrieve, etc.) kinetic penetrator 10 from shaft 100. According to various alternative embodiments, the second end of tether 90 may be coupled to a retrievable component (e.g., a storage volume) or may be coupled to a processor or sensor, among other components of kinetic penetrator 10. Coupling the second end of tether 90 to a portion of kinetic penetrator 10 allows an operator to retrieve such components from a shaft. Such recovery may be preferred to examine the ground material within the storage volumes, to reuse at least a portion of kinetic penetrator 10, or to remove kinetic penetrator 10 from an underground volume, among other reasons.

Figure 12:
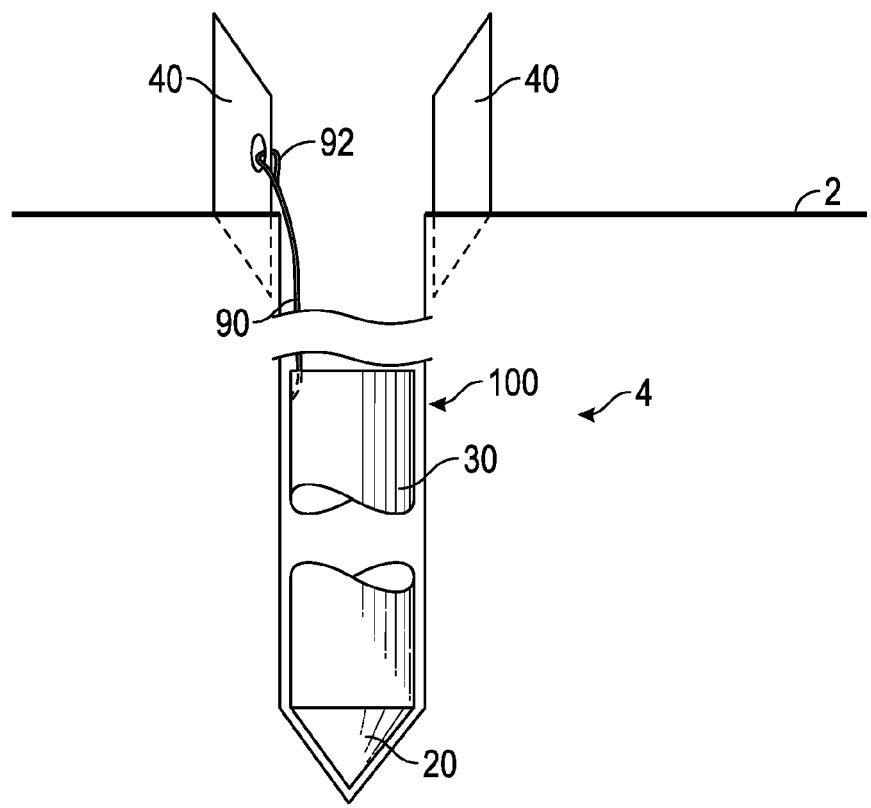
FIG. 12 is an elevation view of a kinetic penetrator having a retrieval tether coupled to a surface drag device.

Referring next to the embodiment shown in FIG. 12, a portion of kinetic penetrator 10 remains proximate ground surface 2 even after body 30 travels through underground volume 4. Having a portion of kinetic penetrator 10 remain proximate ground surface 2 provides various advantages, such as facilitating the retrieval of one or more components of kinetic penetrator 10 and providing ground-level data communication capabilities, among others. As shown in FIG. 12, fins 40 are releasably coupled to body 30 and interact with ground material proximate ground surface 2. According to one embodiment, such interaction causes fins 40 to separate from body 30 and become secured within the ground material. According to an alternative embodiment, kinetic penetrator 10 includes a different type of retaining component (e.g., plate, disk, hook, etc.) coupled to a portion of body 30 or fins 40 and configured to remain proximate ground surface 2 after body 30 travels through underground volume 4. According to still another alternative embodiment, kinetic penetrator 10 does not include removably coupled fins or a different type of retaining component.

Figure 13:
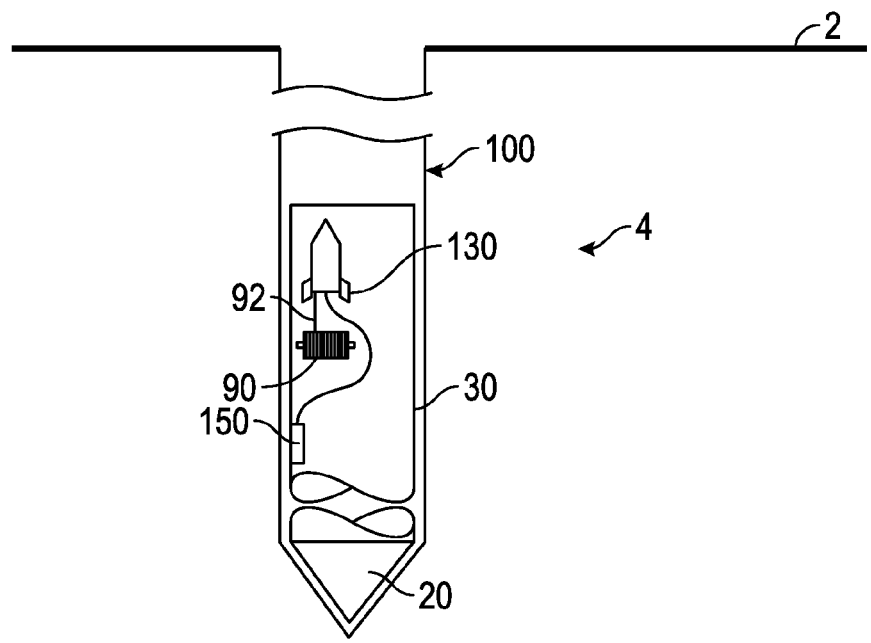
FIG. 13 is an elevation view of a kinetic penetrator having a deployable retrieval tether.

Referring next to the embodiments shown in FIGS. 12-13, several components may be used to extend tether 90 between a portion of kinetic penetrator 10 (e.g., body 30, compartment 160, etc.) and ground surface 2. As shown in FIG. 12, the first end 92 of tether 90 is a loop disposed through an aperture within fin 40. According to one embodiment, fins 40 are stripped off by impact and remain proximate ground surface 2 such that tether 90 is paid out as body 30 travels through underground volume 4. Such a configuration allows an operator to later retrieve a component (e.g., body 30, nose 20, a storage volume, etc.) from shaft 100. According to an alternative embodiment, tether 90 is coupled to a releasable member (e.g., a surface drag device, an aerodynamic drag device, etc.) and to another portion of kinetic penetrator 10 (e.g., body 30). A deployment mechanism is triggered (e.g., pre-impact with an altimeter or other device, upon impact with an impacted-triggering device, etc.) to deploy the releasable member from kinetic penetrator 10. In one embodiment, the releasable member is an aerodynamic drag device (e.g., a parachute, etc.), and an altimeter device triggers the deployment mechanism to release the aerodynamic drag device when kinetic penetrator 10 is one hundred feet above ground surface 2.

According to the alternative embodiment shown in FIG. 13, first end 92 of tether 90 is coupled to a post-impact tether deployment mechanism, shown as device 130. In some embodiments, device 130 is actuated after kinetic penetrator 10 comes to rest within underground volume 4. In other embodiments, device 130 is actuated as kinetic penetrator 10 is traveling through underground volume 4. Device 130 is a component that travels (e.g., climbs, is propelled, etc.) from kinetic penetrator 10 to ground surface 2. By way of example, device 130 may be a climbing mechanism that travels through underground volume 4 by interfacing with the walls of shaft 100. As shown in FIG. 13, device 130 is a pyrotechnic device (e.g., a rocket) coupled to first end 92 of tether 90. According to one embodiment, device 130 travels with body 30 through underground volume 4 and is thereafter actuated (e.g., remotely actuated by an operator, actuated after a period of time, actuated with an altimeter-based system, etc.) to bring first end 92 of tether 90 toward ground surface 2. Device 130 thereby facilitates the retrieval of at least a portion of kinetic penetrator 10.

According to one embodiment, kinetic penetrator 10 also includes a processing circuit, shown as module 150. As shown in FIG. 13, module 150 is coupled (e.g., fastened, attached with isolators, suspended within, etc.) body 30. Such a module 150 is used to trigger (e.g., release, initiate, start, etc.) device 130. According to one embodiment, module 150 is electrically, chemically, hydraulically, or pneumatically coupled to device 130.

Regardless of the system utilized to configure tether 90 in an extended position between body 30 and ground surface 2, various techniques may be utilized to remove a retrievable component (e.g., body 30, compartment 160, compartments 400, another portion of kinetic penetrator 10, etc.). According to one embodiment, a user may manually retrieve the component by pulling upward on first end 92 of tether 90. According to various alternative embodiments, an operator may attach a winch and wind tether 90 to bring the component to the surface or an operator may couple first end 92 to a vehicle and move the vehicle away from shaft 100 thereby causing the component to rise within shaft 100. An operator may pull on tether 90 until the component becomes wedged within shaft 100. Thereafter, the operator may release the tension in tether 90 and again pull on tether 90. Such a process of a lack of tension followed by a sudden pull resembles the operation of a hammer-drill and may facilitate the retrieval of at least a portion of kinetic penetrator 10. According to an alternative embodiment, the retrievable component includes a movable free mass coupled to tether 70. The movable free mass may slide within a portion of the retrievable component (e.g., a shell). To retrieve the component, an operator may pull on tether 90 until the retrievable component is wedged within shaft 100 and thereafter release the tension in tether 90 such that the moveable free mass moves (e.g., drops down) relative to at least a portion of the retrievable component. Thereafter, the operator may again pull on tether 90 causing the moveable free mass to contact a portion of the retrievable component thereby producing a hammer-drill action to facilitate extraction of the retrievable component.

According to one embodiment, the retrievable component includes an element configured to facilitate the recovery of the retrievable component from shaft 100. Such an element may include a portion of the retrievable component shaped to deflect subterranean in-fill from the shaft 100 created by the kinetic penetrator 10. Suitable shaped portions include a pointed, domed, or another structure coupled to an upper portion of the retrievable component.

According to an alternative embodiment, the retrievable component includes a dispenser. Such a dispenser may release a fluid that facilitates the recovery of the retrievable component. According to one embodiment, the fluid is compressed air stored within the retrievable component. According to an alternative embodiment, the fluid is water or a lubricating substance that allows the retrievable component to move upward through the in-fill within shaft 100. According to still another alternative embodiment, the retrievable component may include a structure (e.g., arm, blade, bit, etc.) that forces aside, drills through, cuts, or otherwise engages the subterranean in-fill to facilitate the recovery of the retrievable component.

Figure 14:
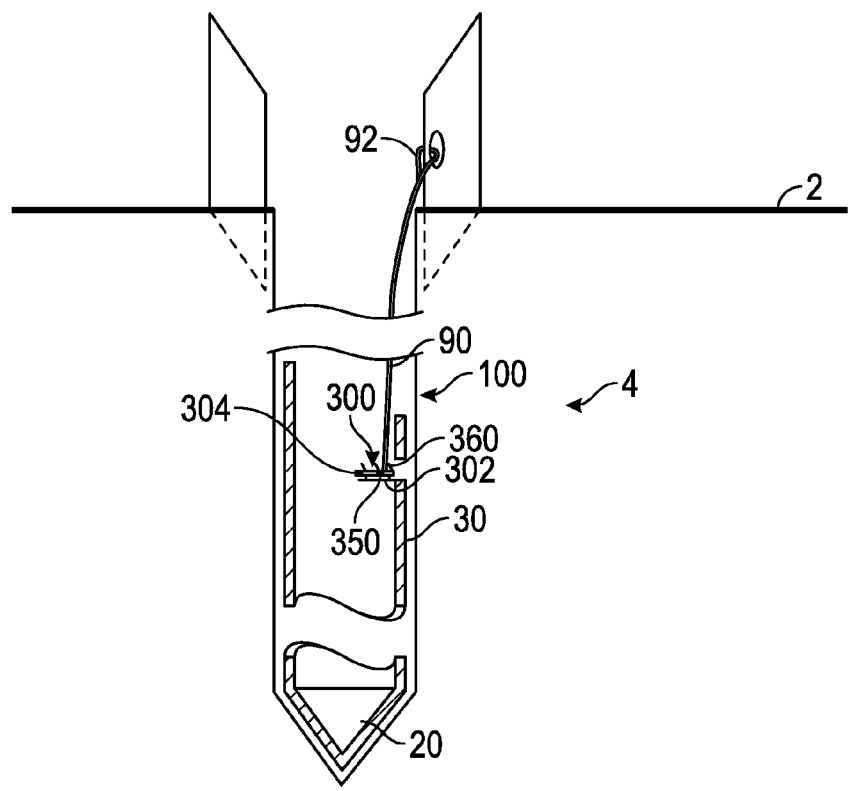
FIG. 14 is an elevation view of a kinetic penetrator having a deployable module.

Referring next to the embodiment shown in FIG. 14, kinetic penetrator 10 includes a sampling device, shown as instrument 350 positioned within a retrievable component, shown as capsule 300. Such an instrument 350 may facilitate the exploration of an area of land by collecting (e.g., storing onboard, sending to a storage center, sending to an operator, etc.) data about various aggregate, oil, gas, or other substances within underground volume 4. According to one embodiment, instrument 350 monitors the acceleration of kinetic penetrator 10 as it travels through underground volume 4. Such acceleration data may be used to determine the hardness of the aggregate, gas, oil, or other substances that comprise underground volume 4. According to an alternative embodiment, instrument 350 is at least one of a transmitter, a resonator, a transponder, and a receiver capable of detecting electromagnetic or acoustic signals associated with geophysical remote sensing. Such an instrument 350 may send or interact with radio-frequency waves to calibrate radar or synthetic aperture radar systems.

According to various alternative embodiments, instrument 350 may include a depth identifier to determine the corresponding depth for collected samples, a temperature sensor, a pressure sensor, a conductivity measurement system, a seismograph, a strain or displacement sensor, a radiation sensor, a metal detector, an infrared sensor, a camera, an x-ray fluorescent spectrometer, a neutron source, a communication system, an acoustic transceiver, an electromagnetic transceiver, a navigation system, or a control system.

As shown in FIG. 14, capsule 300 may be coupled to a tether 90. According to one embodiment, such a tether 90 may facilitate the retrieval of capsule 300, instrument 350, or another portion of capsule 300. According to an alternative embodiment, tether 90 transmits data signals from instrument 350 to ground surface 2 or may power a portion of capsule 300, such as instrument 350 (e.g., with electrical energy, liquid fuel, solid fuel, etc.). According to one embodiment, tether 90 is coupled to both body 30 and at least a portion of capsule 300 such that both body 30 and capsule 300 or a portion thereof may be simultaneously retrieved.

Referring still to the embodiment shown in FIG. 14, capsule 300 is initially located within body 30. As shown in FIG. 14, kinetic penetrator 10 includes a cover, shown as door 302 that seals an aperture within the sidewall of body 30. According to one embodiment, kinetic penetrator 10 includes a driver, shown as deployer 304, that transfers (e.g., ejects, thrusts, moves, etc.) capsule 300 from within body 30 into shaft 100 or underground volume 4.

As shown in FIG. 14, deployer 304 is a rocket-propelled system. According to an alternative embodiment, deployer 304 may be a hydraulic system, a pyrotechnic system, a pneumatic system, or an electrical system configured to propel capsule 300 from within body 30. According to one embodiment, door 302 is rotatably coupled to body 30. According to an alternative embodiment, door 302 includes a sliding mechanism, a cover configured to disengage from body 30, or another interface capable of sealing and selectively opening an aperture within body 30. Such a door 302 may be operated electronically with an actuator such that capsule 300 may be deployed at a preferred depth below ground surface 2. According to another alternative embodiment, capsule 300 may also include a driver configured to transport (e.g., propel, drive, move, etc.) at least a portion of capsule 300, instrument 350, a storage volume, or a surface drag device coupled to a deployable tether upwards towards ground surface 2. Where the driver transports a surface drag device towards ground surface 2, an operator may recover the surface drag device and retrieve at least a portion of capsule 300 by pulling it from shaft 100 with the tether. Such a driver may include a rocket, hydraulic, pneumatic, electrical, or other type of propulsion system.

According to an alternative embodiment, a housing of the capsule may include a storage volume and a sampling tool having an edge coupled to the storage volume and positioned around an aperture. Such a housing may facilitate the transfer of ground material into the storage volume for later examination. By way of example, a housing having a storage volume may be propelled (e.g., driven, transferred, etc.) with a driver from the body of the kinetic penetrator and into a corresponding portion of the underground volume. Such propulsion may occur at a preferred depth below the ground surface and may allow for directional (e.g., lateral, angled etc.) sampling relative to the primary shaft of the kinetic penetrator. A housing having a storage volume may also include a tether coupled to at least one of the housing and the storage volume to facilitate removing the sampled ground material from the underground volume.

Referring again to the embodiment shown in FIG. 14, capsule 300 includes a retaining system, shown as surface drag device 360. Such a surface drag device 360 is configured to secure capsule 300 to a sidewall of shaft 100 at a preferred depth below ground surface 2. As shown in FIG. 14, surface drag device 360 includes a plurality of angled bars coupled to an outer surface of capsule 300. According to an alternative embodiment, surface drag device 360 may include a deployed system such as a plurality of explosively extending bars, a hook system, an adhesive disposed around capsule 300, or another system configured to prevent capsule 300 from moving along a wall of shaft 100.

According to one embodiment, kinetic penetrator 10 includes a plurality of capsules 300. Such capsules 300 may be deposited into a surface of shaft 100 either at various different depths or may be released simultaneously at a single depth. According to one embodiment, a plurality of kinetic penetrators 10 are deployed in an array. An array of kinetic penetrators 10 having capsules 300 allows for an operator to collect data from multiple references at approximately the same horizontal location. According to an alternative embodiment, various kinetic penetrators each having a single capsule 300 may be employed at various penetration depths to similarly provide multiple references.

Figure 15:
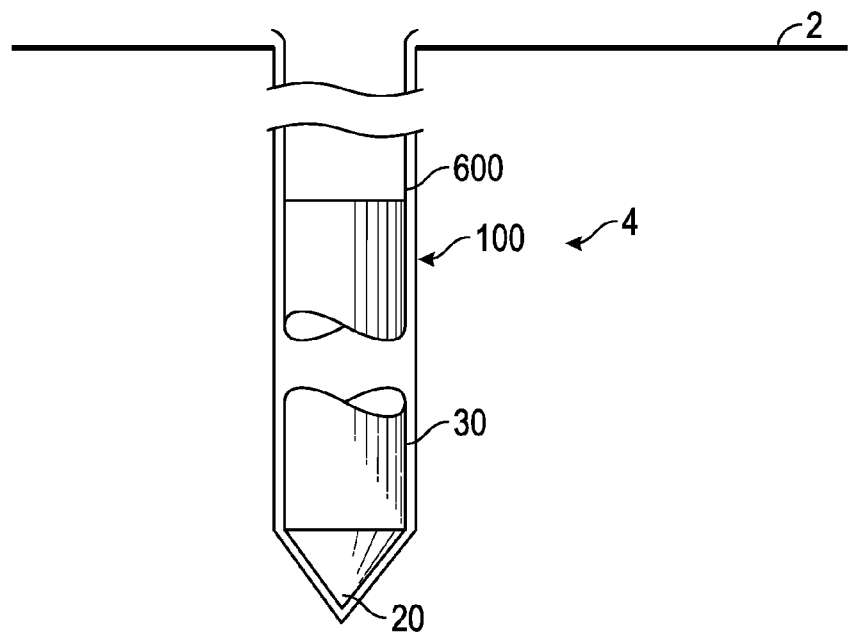

Referring next to the embodiment shown in FIGS. 15-17, kinetic penetrator 10 includes a retrieval facilitation system (e.g., protective sheath, flexible tube, etc.), shown as guide hose 600. Such a guide hose 600 may facilitate the retrieval of body 30, a compartment, or another component of kinetic penetrator 10 and may also prevent in-fill of the ground material into the penetrator shaft. Retrieval of body 30 may be facilitated due to a decreased amount of friction between body 30 and guide hose 600 relative to the friction between body 30 and ground material within an underground volume.

According to the embodiment shown in FIG. 15, guide hose 600 is a flexible, hollow tube configured to line the interior of shaft 100 created by kinetic penetrator 10. According to one embodiment, guide hose 600 is manufactured from a sufficiently flexible and tough material (e.g., a nylon, synthetic, carbon fiber, etc.) to prevent tearing of guide hose 600 or damage to a tether 90 positioned within guide hose 600. Such a guide hose 600 may include an extending section that expands along shaft 100 to the penetration depth of kinetic penetrator 10. The extending section of guide hose 600 may include a coil of material, a roll of material, or a ribbon of material. As shown in FIG. 15, guide hose 600 is coupled to an end of body 30 opposite nose 20. According to an alternative embodiment, guide hose 600 may be coupled to body 30 proximate nose 20 or may be coupled to another portion of kinetic penetrator 10. Such a guide hose 600 may also envelop a capsule thereby facilitating the retrieval of the capsule or an instrument.

According to the alternative embodiments shown in FIGS. 16-17, guide hose 600 is an extendable component. As shown in FIG. 16, guide hose 600 is a bellows positioned within body 30. The bellows may extend thereby increasing the length of guide hose 600. In some embodiments, an inflation system 610 increases the pressure within guide hose 600 (e.g., to extend the bellows, to strengthen the walls of guide hose 600 and prevent crushing, etc.). Inflation system 610 may include a tank of compressed gas, a gas stored as a liquid, a chemical system, or another device. As shown in FIG. 17, guide hose 600 includes a plurality of telescoping cylinders 620. The plurality of telescoping cylinders may sequentially extend from body 30 (e.g., due to catches, due to a tapered shape of the plurality of telescoping cylinders, etc.). The plurality of telescoping cylinders 620 may be manufactured from a rigid material (e.g., metal) or a flexible material.

According to one embodiment, guide hose 600 is deployed simultaneously with tether 90. Such a guide hose 600 may envelop (i.e. surround, encases, etc.) tether 90. According to one embodiment, guide hose 600 is initially located along an outer surface of body 30. According to an alternative embodiment, guide hose 600 may be positioned within body 30 or may be positioned in another location along kinetic penetrator 10.

According to an alternative embodiment, guide hose 600 deploys separately from the tether 90. According to one embodiment, deployment of guide hose 600 from body 30 is accomplished with an ejector. The ejector may include a ring or disk coupled to an end of guide hose 600 and configured to interface with ground surface 2 such that guide hose 600 extends as body 30 travels through underground volume 4. According to an alternative embodiment, the ejector may include a propulsion system (e.g., rocket system, pneumatic system, hydraulic system, electrical system, etc.) that extends guide hose 600 towards ground surface 2. Such an ejector may be controlled (e.g., operated, monitored, interfaced, etc.) with a control system configured to release guide hose after a preferred period of time, upon impact, upon receiving a remote signal, or according to another control scheme.

Figure 18:
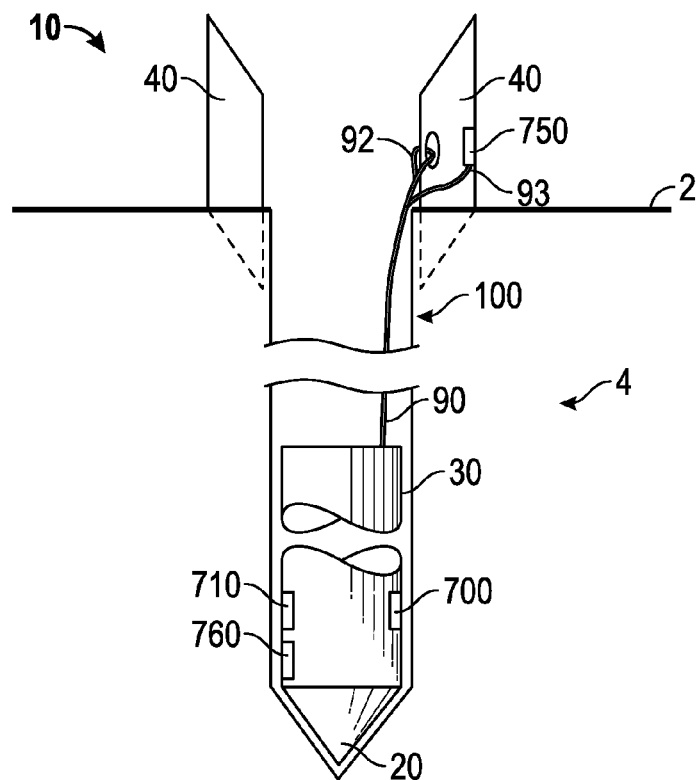
FIG. 18 is an elevation view of a kinetic penetrator having a sensing element.

Referring next to the embodiment shown in FIG. 18, the kinetic penetrator includes various components configured to interact with an external remote sensing system (e.g., a ground-penetrating radar, electric or magnetic field sensor, sonar or other acoustic sensor, etc.). According to one embodiment, the kinetic penetrator serves as a reference point for ground penetrating radar systems, synthetic aperture radars, or acoustic signals. As shown in FIG. 18, the kinetic penetrator includes a locator, shown as positioning system 700, and a secondary locator, shown as inertial navigation system 710. The combined use of positioning system 700 and inertial navigation system 710 allows a user to know the location of body 30 to a high degree of accuracy.

As shown in FIG. 18, positioning system 700 may be coupled to a portion of body 30 and configured to determine the location of kinetic penetrator 10. Such a positioning system 700 may include a global positioning system or a differential global positioning system, among other known location systems. According to one embodiment, kinetic penetrator 10 utilizes positioning system 700 until nose 20 impacts ground surface 2. Thereafter, the position of kinetic penetrator 10 may be determined by using inertial navigation system 710. According to one embodiment, inertial navigation system 710 includes, among other components, a processor, an accelerometer, and a gyroscope.

Referring still to the embodiment shown in FIG. 18, kinetic penetrator 10 includes a tether 90 coupled to a portion of body 30. According to an alternative embodiment, tether 90 is coupled to another component of kinetic penetrator 10 (e.g., positioning system 700, inertial navigation system 710, etc.). As shown in FIG. 18, tether 90 is a data communication link between the components of kinetic penetrator 10 located at a penetration depth (e.g., body 30, positioning system 700, inertial navigation system 710, etc.) and components of kinetic penetrator 10 located proximate ground surface 2. According to one embodiment, the data communication link facilitates the transmission of location and timing data among the components of kinetic penetrator 10 even after emplacement within underground volume 4.

According to the embodiment shown in FIG. 18, kinetic penetrator 10 includes a data communication system, shown as transmitter 750. Transmitter 750 is configured to convey signals (e.g., radio waves, communicate with a satellite system, etc.) regarding a characteristic of kinetic penetrator 10. Such characteristics may include the entrance hole location, the time of impact, and velocity profile of kinetic penetrator 10, among others. In some embodiments, a cable 93 couples transmitter 750 with a sensor of kinetic penetrator 10. By way of example, the sensor may include an attitude sensor that measures the orientation or tilt of kinetic penetrator 10 before impact, while traveling through underground volume 4, or after it comes to rest. In other embodiments, cable 93 couples transmitter 750 with a conductivity sensor (e.g., to determine whether kinetic penetrator 10 is in contact with the subterranean material of underground volume 4, etc.), an accelerometer (e.g., to determine the acceleration profile of kinetic penetrator 10, etc.) a temperature sensor, or still another component. Cable 93 may send and receive data between transmitter 750 and the sensor of kinetic penetrator 10 (i.e. data from the sensor may be sent along cable 93 and conveyed by transmitter 750).

The location of kinetic penetrator 10 may be used by an operator (e.g., a mining operation, a geographical exploration team, etc.) or as part of a calibration system. By way of example, signals sent or received with transmitter 750 may indicate the position or other characteristic of kinetic penetrator 10 to an operator. In the embodiment shown in FIG. 18, transmitter 750 is coupled to a component of kinetic penetrator 10 that is configured to remain at or near ground surface 2 as body 30 travels through underground volume 4 (e.g., a fin 40). In other embodiments, transmitter 750 may be deployed from below ground surface 2 while body 30 is traveling through underground volume 4 or after body 30 comes to rest (e.g., with a pyrotechnic device, with a pneumatic device, etc.). In still other embodiments, transmitter 750 may be coupled to an aerodynamic drag device and deployed from kinetic penetrator 10 prior to impact. Transmitter 750 positioned at or near ground surface 2 may convey signals more efficiently than a data communication system positioned deeper within underground volume 4. By way of example, transmitter 750 may convey a data signal further than a data communication system positioned at the penetration depth of body 30. According to an alternative embodiment, transmitter 750 coupled to body 30 or positioned within shaft 100.

As shown in FIG. 18, kinetic penetrator 10 includes a sensing element 760. Sensing element 760 may be coupled to at least one of body 30 and nose 20. In one embodiment, sensing element 760 is positioned along an outer surface of the body 30. By way of example, sensing element 760 may be disposed along an outer side surface of body 30 or at a tail end of body 30. In some embodiments, sensing element 760 is flush with the outer surface of body 30. Sensing element 760 may be configured to interface with a power source. The power source may be a battery within the penetrator or an external power source connected to the penetrator via the tether (e.g., the retrieval tether). The tether may include a metallic wire or an optical fiber. The tether may be configured to pay out as nose 20 penetrates underground volume 4 thereby coupling sensing element 760 with a power supply positioned at ground surface 2. In other embodiments, the power source is configured to receive acoustic or electromagnetic energy (e.g., from an acoustic signal, from an electromagnetic signal, etc.).

Sensing element 760 may include an emitter configured to convey a sensing signal, a detector (i.e. a sensor) configured to receive a sensing signal, a transponder configured to receive a sensing signal and convey a response signal (e.g., an active transponder, a passive transponder, etc.), or a passive target (e.g., a pickup, a resonant device, a corner cube, etc.). Sensing element 760 may be used to as a component of an external multistatic geophysical sensing system (e.g., a ground penetrating radar, a synthetic aperture radar, a magnetometer, a magnetometer array, a seismic sensor, a seismic array, an electric field sensor, an electric field sensor array, an acoustic sensor, and an acoustic sensor array, etc.). Sensing element 760 may be used to enable or enhance geophysical sensing capabilities or to calibrate the geophysical sensing system. According to one embodiment, kinetic penetrator 10 may be used to calibrate reflection, attenuation, and refraction properties of overlying material. A synthetic aperture radar system may rely on the reflection, refraction, and attenuation characteristics of various materials to identify and locate them within an underground volume. According to an alternative embodiment, kinetic penetrator 10 interacts with a plurality of geophysical remote sensing systems, such as ground penetrating radar and systems measuring seismic impulses.

Figure 19:
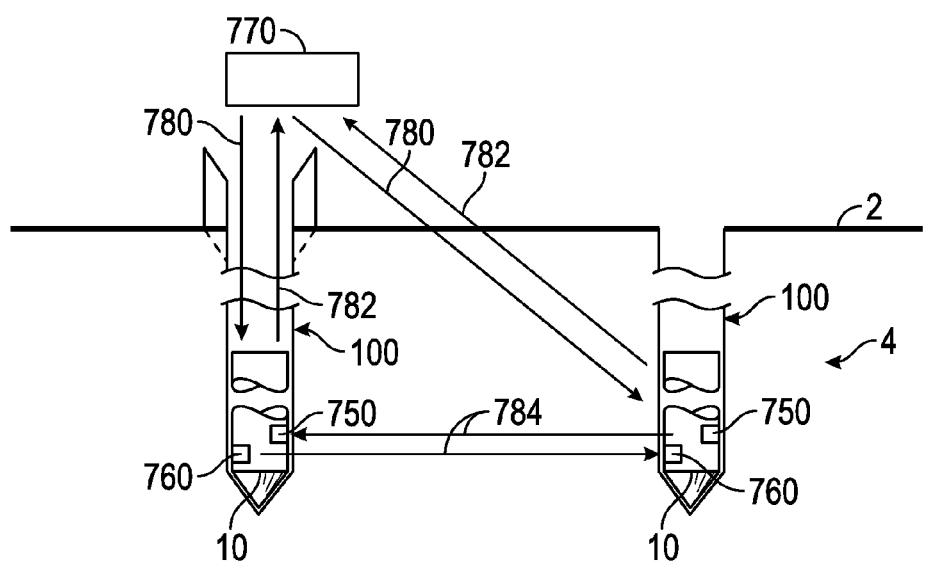
FIG. 19 is a side plan view of a remote sensing system and a plurality of kinetic penetrators.
Figure 20:
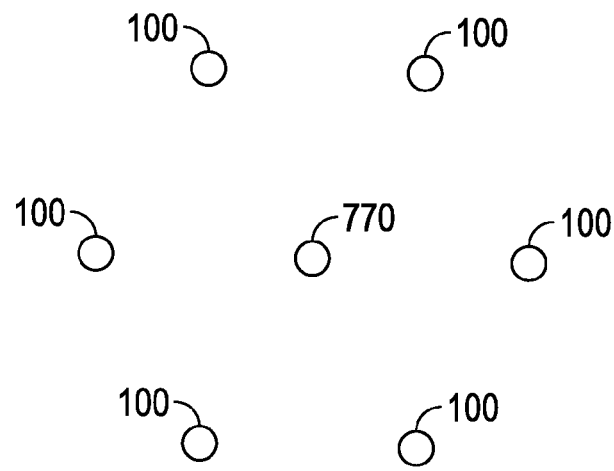
FIG. 20 is a top plan view of a remote sensing system and a plurality of kinetic penetrator shafts.

Referring to FIGS. 19-20, a plurality of kinetic penetrators 10 are deployed as part of a multistatic geophysical sensing system. As shown in FIG. 19, kinetic penetrators 10 interact with a remote sensing system 770. Remote sensing system 770 may include a ground-penetrating radar, an electric or a magnetic field sensor, a sonar or other acoustic sensor, or still another device. In one embodiment, remote sensing system 770 conveys sensing signals 780 to sensing elements 760. Sensing elements 760 may include detectors that receive sensing signals 780. As shown in FIG. 19, sensing elements 760 convey signals 782 to remote sensing system 770. By way of example, sensing elements 760 may include transponders or passive targets that receive sensing signals 780 and convey sensing signals 782. By way of another example, sensing elements 760 may include emitters that convey sensing signals 782. According to the embodiment shown in FIG. 19, sensing elements 760 send and receive sensing signals 784 between one another. In some embodiments, sensing elements 760 only receive sensing signals 780, only convey sensing signals 782, only send or receive sensing signals 784, or send and receive a combination of sensing signals 780, sensing signals 782, and sensing signals 784. While shown in FIG. 19 as positioned above ground surface 2, remote sensing system 770 may be positioned below or at ground surface 2, according to various embodiments.

As shown in FIG. 19, sensing element 760 travels with body 30 into underground volume 4. Sensing element 760 positioned below ground surface 2 may provide additional paths over which sensing is performed (e.g., by adding additional paths for a multipoint sensing system). Sensing element 760 may also add paths not otherwise available as part of the multipoint sensing system (e.g., from underground to a ground surface, from a ground surface to an underground depth, from one underground location to another underground location, etc.). Such calibration and focusing is facilitated by sensing element 760, which may convey a sensing signal having specified characteristics (e.g., frequency, amplitude, wavelength, polarization, angle, etc.). Characteristics of the received sensing signal may be compared to those of the sensing signal conveyed by sensing element 760 to form a profile for the intervening material. According to one embodiment, the composition of the intervening material of underground volume 4 may be measured through the use of a kinetic penetrator having a storage volume, as discussed above.

As shown in FIG. 20, a plurality of kinetic penetrators positioned within shafts 100 may interact with remote sensing system 770. In one embodiment, the kinetic penetrators are positioned in a regular array. In other embodiments, the kinetic penetrators are irregularly positioned. Remote sensing system 770 may itself be positioned within a shaft (e.g., a drill hole) and interact with the sensing elements of the kinetic penetrators. By way of example, a plurality of kinetic penetrators may be positioned (e.g., dropped, deployed, etc.), and remote sensing system 700 may be deployed within a drill hole. Use of kinetic penetrators 10 reduces the number of drill holes needed to calibrate a multistatic geophysical sensing system or directly evaluate a subterranean ground volume.

In one embodiment, sensing element 760 is an active point source (i.e. an emitter) that transmits sensing signals from below ground surface 2. Such sensing signals may include radio waves or acoustic waves, among other types of waves. By way of example, the active point source may be an electromagnetic emitter, an acoustic emitter (e.g., a transducer), a seismic emitter, an electric field source, a magnetic field source, or an electrode for at least one of an electric field source and an electric current source, among other alternatives. According to one embodiment, body 30 includes a material that facilitates the transmission of sensing signals. By way of example, body 30 may be partially transmissive to electromagnetic radiation or acoustic energy, may include an insert that is at least one of polymeric and ceramic, or may include a nonconductive material, among other alternatives.

In one embodiment, sensing element 760 includes a transducer. The transducer may be configured to convey a sensing signal as acoustic waves from a depth below ground surface 2. According to one embodiment, the transmission of acoustic sensing signals is facilitated by direct contact between the transducer and the surrounding material. According to an alternative embodiment, a coupling fluid is positioned between the transducer and the surrounding material to facilitate the transmission of the acoustic sensing signal. The transducer may be shaped as a dipole, loop, or slot and may transmit a fixed beam, a mechanically steered beam, or an electronically steered beam. According to an alternative embodiment, sensing element 760 includes a plurality of transducers. Such transducers may be arranged in at least one of a dipole or cardioid.

According to one embodiment, the active point source includes an antenna configured to convey the sensing signal from below ground surface 2. Sensing element 760 may operate at a depth below ground surface 2 and transmit a sensing signal through the surrounding material with the antenna. The antenna may be shaped as a dipole, loop, or slot and may transmit a fixed beam, a mechanically steered beam, or an electronically steered beam. According to an alternative embodiment, sensing element 760 includes a plurality of antennas. Such antennas may be arranged in at least one of a dipole or cardioid.

The sensing signals from sensing element 760 (e.g., radio waves from an antenna, acoustic waves from a transducer, reflected waves, etc.) may be received at a location above ground surface 2. By way of example, an operator may position an antenna, microphone, or other device above ground surface 2 to receive sensing signals from sensing element 760. In other embodiments, the sensing signals are received by another device as part of a geophysical sensing system (e.g., an antenna of a synthetic aperture radar system, another antenna, a ground penetrating radar device, etc.). According to another embodiment, the sensing signals from sensing element 760 are received by another device positioned below ground surface 2. A first sensing element 760 (e.g., an active point source) may convey a sensing signal (e.g., a signal having specified characteristics), and a second sensing element 760 (e.g., a detector, a passive point target, a transponder, etc.) may at least one of receive and reflect the sensing signal from the first sensing element 760. In one embodiment, first sensing element 760 includes a detector that receives a sensing signal from second sensing element 760. Second sensing element 760 may be deployed as part of a second kinetic penetrator 10. By way of example, a plurality of kinetic penetrators 10 may be deployed to send and receive sensing signals between one another. A plurality of kinetic penetrators 10 having sensing elements 760 may be deployed to evaluate a characteristic (e.g., density, conductivity, etc.) of an intermediate ground volume. The plurality of sensing elements 760 may include various combinations of active point sources, passive point targets, or transponders, the plurality of sensing elements 760 forming a multistatic geophysical sensing system. A processing circuit may evaluate the sensing signal from the first sensing element 760 and the signal at least one of received and reflected by the second sensing element 760 to determine the characteristic of underground volume 4. The processing circuit may be used to conduct geophysical sensing or to calibrate an external geophysical sensing system.

According to one embodiment, sensing element 760 transmits a sensing signal having a specified property (e.g., wavelength, frequency, an impulse, a chirp profile, etc.). The sensing signal may be a calibration signal designed to reduce at least one of an uncertainty and an error in an external geophysical sensing system. In another embodiment, the sensing signal is a measurement signal designed to facilitate measurement of underground volume 4. In some embodiments, the sensing signal is a continuous wave having a specified frequency. In other embodiments, the sensing signal includes a chirp waveform. The sensing signal may have single or dual polarization in one or more directions, and the polarization may be linear or circular. According to one embodiment, the sensing signal conveyed by sensing element 760 encodes data. The data may include tagging information identifying the location and time of transmission among other identifiers. Such a sensing element 760 may convey a sensing signal periodically. According to one embodiment, the sensing signal is encrypted (i.e. similar to passive RFID tags). Such encryption may be fixed (i.e. a serial number), write-once (e.g., a position offset, written when the penetrator comes to rest), or variable (e.g., based on current temperature or local moisture content).

According to one embodiment, the active point source includes a processing circuit having a memory. Data relating to a pre-programmed sensing signal for the active point source may be stored in the memory. According to an alternative embodiment, data relating to a pre-programmed emission time is stored in the memory. By way of example, the data may relate to emitting the sensing signal every hour, at a set time each day, an emission interval (e.g., every two hours), or still another emission time.

The active point source may include a receiver (e.g., an electromagnetic sensor, an acoustic sensor, a component configured to interface with a magnetic field, etc.) coupled to the processing circuit. A command signal may be conveyed to the receiver from a remote source (e.g., a device at ground surface 2). The command signal may direct the active point source to transmit a particular sensing signal, retransmit a sensing signal, or perform still another function. The processing circuit may interpret the command signal and convey an emission signal to the emitter based on the command signal. Upon receiving the emission signal, the emitter may convey the sensing signal. The sensing signal may include a characteristic (e.g., frequency, etc.) that varies based upon the command signal. In one embodiment, the processing circuit conveys the emission signal upon receipt. In another embodiment, the processing circuit delays transmission of the emission signal (e.g., due to an pre-programmed delay, etc.).

According to an alternative embodiment, sensing element 760 includes a detector (i.e. a sensor) that receives a sensing signal. The detector may include an acoustic detector, a seismic detector, an electric field detector, a magnetometer, or an electrode for an electric field sensor, among other types of detectors. According to one embodiment, body 30 includes a material that facilitates the reception of sensing signals. By way of example, body 30 may be partially transmissive to electromagnetic radiation or acoustic energy, may include an insert that is at least one of polymeric and ceramic, or may include a nonconductive material, among other alternatives.

In one embodiment, the detector includes a processing circuit having a memory. The processing circuit may be configured to analyze data relating to the sensing signals received by the detector. In another embodiment, the processing circuit is configured to compress data relating to the sensing signals. In still another embodiment, the processing circuit is configured to store data relating to the sensing signals in the memory. The data may include the received signal itself or a representation of the received sensing signal (e.g., a processed version of the sensing signal, etc.). The detector may include a data communication device (e.g., a tether, an electromagnetic transmitter, an acoustic transmitter, etc.) coupled to the processing circuit. The processing circuit may provide data relating to the sensing signals received by the detector to the data communication device.

In one embodiment, the processing circuit is configured to determine whether data relating to signals received by the detector fall within a specified range. By way of example, data relating to sensing signals having a power (e.g., amplitude, etc.) that is outside of the specified range (e.g., lower than a threshold value) may be discarded. By way of another example, data relating to abnormal sensing signals (i.e. data relating to sensing signals that are outside the specified range) may be provided to the data communication device. Such operation may conserve energy by transmitting via the data communication device only data that is unusual. The processing circuit may provide data to the data communication device in response to a command signal. The command signal may be to send the data immediately, at a specified time, at a specified internal, or according to still another schedule. In some embodiments, data not conveyed via the data communication device may be later collected (e.g., physically by retrieving the memory, etc.).

In still other embodiments, sensing element 760 is a transponder (e.g., an active transponder, a passive transponder, etc.) configured to receive a sensing signal and thereafter convey a response signal having known characteristics. The response signal may be the same type of signal as the sensing signal and may include a series of time-referenced pulse waves. The response signal may facilitate the calibration of an external geophysical sensing system. In one embodiment, the response signal encodes data (e.g., a current time, a location of the transponder, a system status, etc.). The external geophysical sensing system may use the sensing signal and the response signal to determine or verify a characteristic of the intervening ground material (e.g., index of refraction, etc.).

The transponder may include an electromagnetic transponder, an acoustic transponder, or still another type of transponder. According to one embodiment, body 30 includes a material that facilitates the reception of sensing signals and the transmission of response signals. By way of example, body 30 may be partially transmissive to electromagnetic radiation or acoustic energy, may include an insert that is at least one of polymeric and ceramic, or may include a nonconductive material, among other alternatives.

In one embodiment, the transponder includes a timing device configured to delay the response signal. By way of example, the timing device may delay the response signal a predetermined time interval (e.g., ten seconds, as measured in a difference of phase angle or otherwise measured, etc.). In one embodiment, an external geophysical sensing system conveys the sensing signal and receives the response signal from the transponder. The sensing signal may produce reflected signals upon interaction with ground surface 2, underground volume 4, or still other materials. The timing device may facilitate differentiation by the external geophysical sensing system between reflected signals from the intervening materials and the response signal from the transponder.

In another embodiment, sensing element 760 is a passive point target configured to reflect sensing signals sent by another device (e.g., another sensing element 760, a transmitter of a ground penetrating radar system, a transceiver of a synthetic aperture radar system, etc.). The passive point target may be a radiofrequency resonator, an enhanced cross section reflector (e.g., a corner cube, etc.), or still another device. The passive point target may include resonators disposed along a surface of body 30 and arranged in a line array. According to one embodiment, the resonators have a high cross section when exposed to a radio-frequency wave having a particular characteristic (e.g., wavelength, incident angle, frequency, polarization, etc.). In some embodiments, the passive point target is configured to reflect sensing signals having a wavelength that is longer than the diameter of body 30.

A passive point target may facilitate calibration for radar and synthetic aperture radar systems. Waves emanating from a transceiver of the radar or synthetic aperture radar system may be reflected by the passive point target. According to one embodiment, the passive point target has characteristics that produce reflected waves with known characteristics. The radar or synthetic aperture radar system may then compare the actual received reflected wave with an expected received reflected wave to calibrate various parameters of the radar or synthetic aperture radar system.

According to an alternative embodiment, sensing element 760 is configured to interface with a magnetic field (e.g., as part of a geophysical sensing system, etc.). By way of example, the magnetic field may be generated by a source (e.g., a device positioned above ground surface 2, another sensing element 760 coupled to another kinetic penetrator 10 and positioned below ground surface 2, etc.). Sensing element 760 may include a magnet (e.g., a permanent magnet, an electromagnet, etc.) positioned within the magnetic field to calibrate a magnetic device (e.g., a magnetometer, etc.).

Sensing element 760 may include a driver (e.g., a linear actuator, a rotational actuator, a motor, etc.) configured to move the magnet within the magnetic field according to a known movement profile thereby producing a known perturbation in the magnetic field. In another embodiment, sensing element 760 includes a switch coupled to an electromagnet. The switch may turn "on" and "off" the electromagnet or vary the strength of the electromagnet, among other alternatives. The actuation of the driver, switch, or other device may be facilitated or controlled using a processor. The processor may include memory for storing actuation programs for the driver, switch, or other device therein. In some embodiments, sensing element 760 includes pairs of magnets, the pairs of magnets forming a quadrapole.

According to still another alternative embodiment, kinetic penetrator 10 applies an electric field across the underground volume 4. The electric field may be used to determine a characteristic of the subterranean ground material (e.g., conductivity) or to calibrate a permeability or conductivity, among other alternatives. Such an electric field may include a voltage applied between body 30 (e.g., positioned below ground surface 2) and a conductor (e.g., a stake) positioned at or near ground surface 2. In some embodiments, the conductor is deployed from body 30 prior to impact (e.g., with an aerodynamic drag device, etc.). In other embodiments, the conductor is deployed from body 30 upon impact, as body 30 travels through underground volume 4, or after body 30 comes to rest. Such deployment may occur due to contact with the ground material, with a pyrotechnic device, with a pneumatic device, or with still another device. In other embodiments, kinetic penetrator 10 may apply an electric field across two depths of underground volume 4 (i.e. the conductor may be located below ground surface 2). In still other embodiments, a plurality of kinetic penetrators 10 are deployed, and an electric field is applied across underground volume 4 between the plurality of kinetic penetrators 10.

According to one embodiment, sensing element 760 may be included within a retrievable component. In some embodiments, the retrievable component is driven into underground volume 4 (e.g., after kinetic penetrator 10 comes to rest, as kinetic penetrator 10 is traveling through underground volume 4, etc.) with an ejector. The retrievable component may include a surface drag device to secure it within underground volume 4. A retrieval system including a tether (e.g., tether 90) may be coupled to the retrievable component, the tether facilitating recovery of the retrievable component from the subterranean ground volume. Such a retrievable component may allow an operator to retrieve data stored on a memory of sensing element 760 or sensing element 760 itself. Retrieval of sensing element 760 may reduce the costs associated with calibrating a geophysical sensing system by allowing for reuse of expensive instruments disposed therein.

In one embodiment, the retrieval system includes a surface drag device coupled to an end of the tether, and the retrievable component is positioned along the length of the tether. The surface drag device may be releasably coupled to body 30. In one embodiment, the tether pays out as the surface drag device separates from body 30 to position the retrievable component between ground surface 2 and body 30. Positioning the retrievable component along the length of the tether may facilitate locating sensing element 760 at a preferred depth below ground surface 2. By way of example, the surface drag device may separate from body 30 as kinetic penetrator 10 passes through ground surface 2, thereby paying out the tether and positioning sensing element 760 at a preferred depth that may be independent of the penetration depth of kinetic penetrator 10. The surface drag device may include an interfacing portion to engage surrounding material such that the surface drag device remains at or near ground surface 2. In another embodiment, a propelling device ejects the surface drag device toward ground surface 2, thereby paying out the tether.

Figure 21:
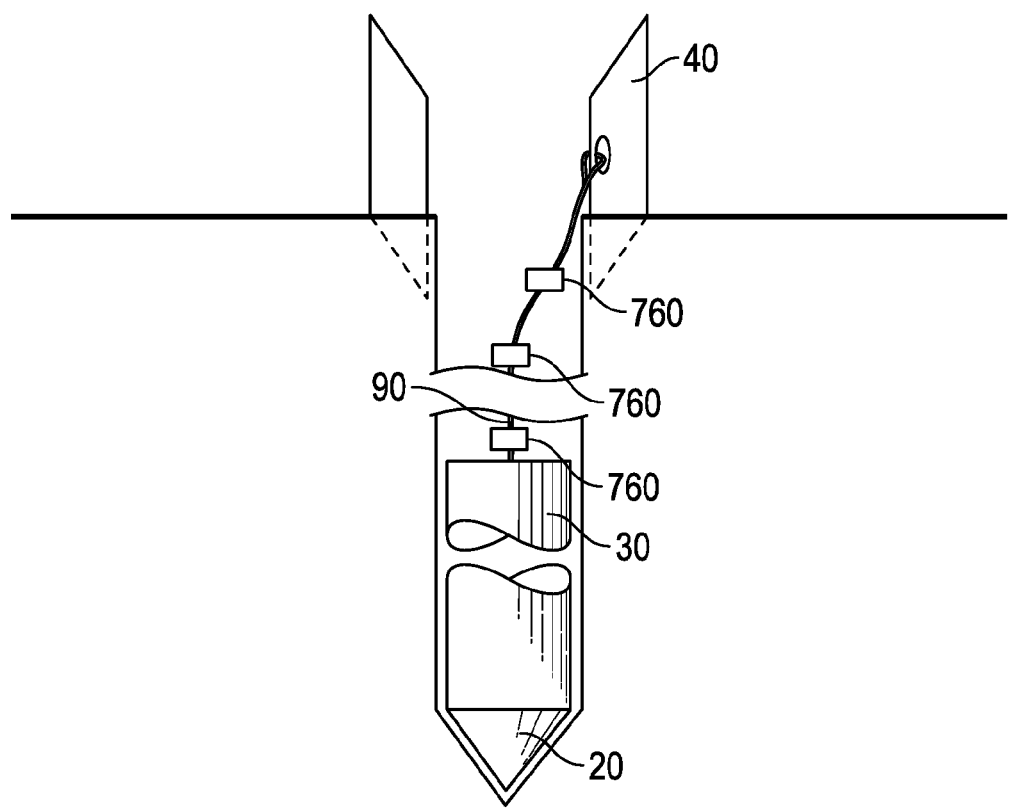
FIG. 21 is a side plan view of a kinetic penetrator including a plurality of sensing elements.

According to one embodiment, kinetic penetrator 10 includes a single sensing element 760. According to the embodiment shown in FIG. 21, kinetic penetrator 10 includes a plurality of sensing elements 760. A plurality of sensing elements 760 may further facilitate the calibration of an external sensing system (e.g., a ground penetrating radar system, a synthetic aperture radar system, etc.). In another embodiment, the plurality of sensing elements 760 are used to evaluate a subterranean ground volume. As shown in FIG. 21, a single kinetic penetrator 10 may deploy several sensing elements 760 at different depths, thereby increasing the potential level of calibration or measurement without the introduction of additional kinetic penetrators 10. In some embodiments, sensing elements 760 are deployed from kinetic penetrator 10 as body 30 travels through underground volume 4. By way of example, sensing elements 760 may be driven into the surrounding subterranean ground volume at various depths as body 30 travels through underground volume 4. According to the embodiment shown in FIG. 21, sensing elements 760 are coupled to, and thereby deployed with, tether 90. The plurality of sensing elements 760 may interface with a remote sensing system (e.g., a synthetic aperture radar system), a local sensor, or with one another to determine a characteristic of the surrounding ground volume. By way of example, a first sensing element 760 positioned at body 30 may include an active point source that conveys sensing signals toward a second sensing element 760 deployed within underground volume 4. Comparison of the sensing signal transmitted by the first sensing element 760 with the sensing signal received by the second sensing element may facilitate the characterization of the underground volume 4.

According to one embodiment, various kinetic penetrators may be positioned to form a sensor network. Such a sensor network may improve the ability to calibrate radar and synthetic aperture radar systems or may function as a multistatic geophysical sensing system. According to one embodiment, the sensor network includes various kinetic penetrators arranged in a line or two-dimensional array. Such an array may serve as a reference grid for spatial calibration of various conventional borehole radars operating in bistatic mode. According to an alternative embodiment, transmitters, transponders, or receivers may communicate with a sensing signal sent through the underground volume to form a modified sensing signal. Processing of the modified sensing signal (e.g., in a manner similar to synthetic aperture radar sensing systems) may provide location or identification information about aggregate, oil, gas, or other materials located within the underground volume.

It is important to note that the construction and arrangement of the elements of the systems and methods as shown in the embodiments are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the enclosure may be constructed from any of a wide variety of materials that provide sufficient strength or durability, in any of a wide variety of colors, textures, and combinations. The order or sequence of any process or method steps may be varied or re-sequenced, according to alternative embodiments. Other substitutions, modifications, changes, and omissions may be made in the design, operating conditions, and arrangement of the preferred and other embodiments without departing from scope of the present disclosure or from the spirit of the appended claims.

The present disclosure contemplates methods, systems, and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data, which cause a general-purpose computer, special purpose computer, or special purpose processing machines to perform a certain function or group of functions.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps, and decision steps.

What is claimed is:
1. A kinetic penetrator for multistatic geophysical sensing, comprising:
 a tubular body having a first end and a second end;
 a nose coupled to the first end of the tubular body, wherein the nose is configured to penetrate a ground surface and subsurface materials of a subterranean ground volume;

a sensing element releasably coupled to at least one of the tubular body and the nose, the sensing element configured to interface with an external geophysical sensing system;
a tether coupled to the sensing element; and
a surface drag device coupled to an end of the tether, wherein the sensing element is positioned along the length of the tether,
wherein the tether is configured to facilitate retrieval of the sensing element from the subterranean ground volume.

2. The penetrator of claim 1, wherein the nose penetrates the subterranean ground volume to a specified depth that is greater than the length of the tubular body.

3. The penetrator of claim 1, wherein the sensing element includes an emitter configured to convey a sensing signal.

4. The penetrator of claim 3, the emitter further comprising a processing circuit including a memory, wherein the processing circuit is coupled to the emitter.

5. The penetrator of claim 4, wherein the memory includes data relating to a pre-programmed signal for the emitter.

6. The penetrator of claim 4, wherein the memory includes data relating to a pre-programmed emission time for the emitter.

7. The penetrator of claim 4, wherein the memory includes data relating to a pre-programmed emission interval for the emitter.

8. The penetrator of claim 4, further comprising a receiver coupled to the processing circuit, wherein the processing circuit is configured to convey an emission signal to the emitter based on a command signal from the receiver.

9. The penetrator of claim 8, wherein the processing circuit conveys the emission signal upon receiving the command signal.

10. The penetrator of claim 8, wherein the sensing signal includes a characteristic that varies based on the command signal.

11. The penetrator of claim 4, wherein the sensing signal encodes data.

12. The penetrator of claim 4, wherein the sensing signal is a calibration signal designed to reduce at least one of an uncertainty and an error in the external geophysical sensing system.

13. The penetrator of claim 4, wherein the sensing signal is a measurement signal designed to facilitate measurement of the subterranean ground volume by the external geophysical sensing system.

14. The penetrator of claim 3, further comprising a receiver coupled to the emitter, wherein the receiver is configured to convey an emission signal to the emitter based on a command signal.

15. The penetrator of claim 1, wherein the sensing element includes a detector.

16. The penetrator of claim 1, wherein the sensing element includes an active transponder configured to receive a sensing signal and convey a response signal.

17. A kinetic penetrator for multistatic geophysical sensing, comprising:
a tubular body having a first end and a second end;
a nose coupled to the first end of the tubular body, wherein the nose is configured to penetrate a ground surface and subsurface materials of a subterranean ground volume;
a retrievable component releasably coupled to at least one of the tubular body and the nose and including a sensing element configured to interface with an external geophysical sensing system; and
a retrieval system including a tether coupled to the retrievable component and a surface drag device coupled to an end of the tether, wherein the tether is configured to facilitate recovery of the retrievable component from the subterranean ground volume, wherein the retrievable component is positioned along the length of the tether.

18. The penetrator of claim 17, wherein the nose penetrates the subterranean ground volume to a specified depth that is greater than the length of the tubular body.

19. A kinetic penetrator for multistatic geophysical sensing, comprising:
a tubular body having a first end and a second end;
a nose coupled to the first end of the tubular body, wherein the nose is configured to penetrate a ground surface and subsurface materials of a subterranean ground volume;
a retrievable component including a sensing element configured to interface with an external geophysical sensing system; and
a retrieval system including (a) a tether coupled to the retrievable component and (b) a surface drag device coupled to an end of the tether, wherein the tether is configured to facilitate recovery of the retrievable component from the subterranean ground volume, wherein the surface drag device is releasably coupled to the tubular body, and wherein the tether is configured to pay out as the surface drag device separates from the tubular body to position the retrievable component between the ground surface and the tubular body.

20. The penetrator of claim 19, further comprising a plurality of sensing elements disposed along the length of the tether.

21. A kinetic penetrator for multistatic geophysical sensing, comprising:
a tubular body having a first end and a second end;
a nose fixed to the first end of the tubular body, wherein the nose is configured to penetrate a ground surface and subsurface materials of a subterranean ground volume;
a retrievable component releasably coupled to at least one of the tubular body and the nose and including a sensing element configured to interface with an external geophysical sensing system; and
a retrieval system including a tether, wherein the tether is configured to facilitate recovery of the retrievable component from the subterranean ground volume, wherein the tether is coupled to the retrievable component and at least a portion of the tubular body such that recovery of the tubular body likewise removes the retrievable component.

* * * * *